US012656934B2

(12) United States Patent
Maherzi et al.

(10) Patent No.: US 12,656,934 B2
(45) Date of Patent: Jun. 16, 2026

(54) DYNAMIC DATA MASKING FOR GRAPHICAL AND TEXTUAL CONTENT IN ROBOTIC PROCESS AUTOMATION

(71) Applicant: SAP SE, Walldorf (DE)

(72) Inventors: Soufia Maherzi, Paris (FR); Nadia Zvorykin, Paris (FR); Nathan Bienfait, Paris (FR); Alexandre Fortin, Paris (FR); Xiaohui Xue, Courbevoie (FR); Kevin Le Fur, Paris (FR)

(73) Assignee: SAP SE, Walldorf (DE)

( * ) Notice: Subject to any disclaimer, the term of this patent is extended or adjusted under 35 U.S.C. 154(b) by 637 days.

(21) Appl. No.: 18/096,486

(22) Filed: Jan. 12, 2023

(65) Prior Publication Data

US 2024/0241500 A1    Jul. 18, 2024

(51) Int. Cl.
| | |
|---|---|
| *G06F 3/0484* | (2022.01) |
| *G06F 3/04845* | (2022.01) |
| *G06F 8/73* | (2018.01) |
| *G06F 40/166* | (2020.01) |
| *G06F 40/279* | (2020.01) |
| *G05B 19/4155* | (2006.01) |

(52) U.S. Cl.
CPC ........ *G06F 3/0484* (2013.01); *G06F 3/04845* (2013.01); *G06F 8/73* (2013.01); *G06F 40/166* (2020.01); *G06F 40/279* (2020.01); *G05B 19/4155* (2013.01); *G05B 2219/50391* (2013.01)

(58) Field of Classification Search
CPC ...... G06F 3/0484; G06F 3/04845; G06F 8/73; G06F 40/166; G06F 40/279; G05B 19/4155; G05B 2219/50391
See application file for complete search history.

(56) References Cited

U.S. PATENT DOCUMENTS

| | | | | |
|---|---|---|---|---|
| 10,380,355 | B2 * | 8/2019 | Allen | G06F 21/602 |
| 10,546,056 | B1 * | 1/2020 | Cervelli | G06F 40/177 |
| 10,853,097 | B1 * | 12/2020 | Kakhandiki | G06F 9/451 |
| 2015/0089357 | A1 * | 3/2015 | Vandervort | G06F 21/62 |
| | | | | 715/256 |
| 2019/0075218 | A1 * | 3/2019 | Ribani | G06F 3/1238 |
| 2020/0042837 | A1 * | 2/2020 | Skinner | H04L 63/102 |
| 2020/0110902 | A1 * | 4/2020 | Zakour | G06F 16/22 |
| 2020/0380162 | A1 * | 12/2020 | Eisen | G06F 40/131 |
| 2021/0377423 | A1 * | 12/2021 | Park | H04N 1/0035 |
| 2022/0222362 | A1 * | 7/2022 | Ravel | G06F 21/6254 |
| 2023/0081934 | A1 * | 3/2023 | Hagihara | G06F 11/2294 |
| | | | | 700/83 |
| 2023/0117924 | A1 * | 4/2023 | Bhayani | G06F 3/048 |
| | | | | 715/700 |

* cited by examiner

*Primary Examiner* — Rami R Okasha
(74) *Attorney, Agent, or Firm* — Klarquist Sparkman, LLP

(57) ABSTRACT

Systems and methods are provided for dynamic data masking for graphical and textual content in robotic process automation (RPA). Textual and/or graphical content to be obfuscated in an RPA project is indicated. Textual and graphical elements of RPA artifacts and other RPA content of the RPA project corresponding to the indicated textual and/or graphical content are identified and obfuscated. The RPA project is then updated with the obfuscated content and stored. The provided systems and methods for dynamic data masking of graphical and textual content are highly customizable and reduce the possibility of errors. Further, once data obfuscation is established, sensitive data in projects and artifacts are automatically masked as the projects and artifacts are updated or edited.

20 Claims, 17 Drawing Sheets

400

START

405
Load project

410
Identify content in the project to be obfuscated

415
Obfuscate the identified content

420
Update the project with the obfuscated content

425
Replace the project with the updated project

RETURN

500

1100

1120

Overview | Example Project | | Share | Generate Package

△ ↺ ↻ ◊ | Save | ∨

Search...

Declared Application

Screen Details

▢ Example Project
  ▢ Example Screen 1
  ▢ Example Screen 2
  ▢ Example Screen 3

Name

Identifier

Framework

Technology

Declared Elements

Recognition Criteria

▷✐ Element 1
▷✐ Element 2
▷✐ Element 3
▷✐ Element 4

Criteria 1

Criteria 2

1112
1412

1420

Add to Criteria
──────────
Deactivate Element
──────────
Blur
──────────
Delete

1422

Captured Data

Domain: example.domain

URL: https://example.do...

Title: Example Page

CX: 1536

CY: 722

Webpage 1150

Obfuscated Element 1
1361

Obfuscated Element 2
1462

Element 3
1163

Element 4
1164

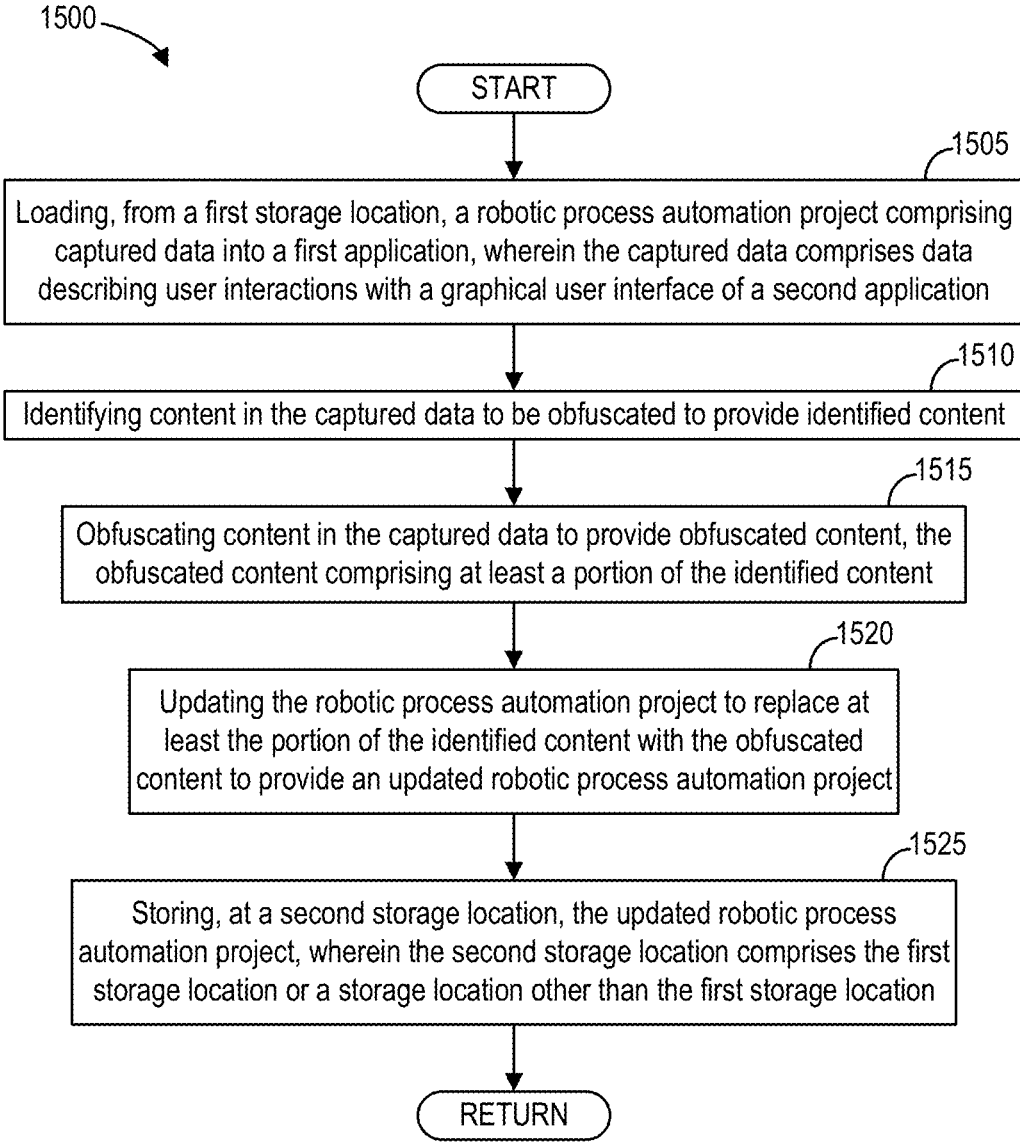

START

1505

Loading, from a first storage location, a robotic process automation project comprising captured data into a first application, wherein the captured data comprises data describing user interactions with a graphical user interface of a second application

1510

Identifying content in the captured data to be obfuscated to provide identified content

1515

Obfuscating content in the captured data to provide obfuscated content, the obfuscated content comprising at least a portion of the identified content

1520

Updating the robotic process automation project to replace at least the portion of the identified content with the obfuscated content to provide an updated robotic process automation project

1525

Storing, at a second storage location, the updated robotic process automation project, wherein the second storage location comprises the first storage location or a storage location other than the first storage location

RETURN

FIG. 15

SOFTWARE 1680 IMPLEMENTING TECHNOLOGIES

DYNAMIC DATA MASKING FOR GRAPHICAL AND TEXTUAL CONTENT IN ROBOTIC PROCESS AUTOMATION

FIELD

The present disclosure generally relates to dynamic data masking for graphical and textual content.

BACKGROUND

Robotic process automation (RPA) can use automation scripts, known as software robots, to automate and standardize repeatable business processes. RPA can mimic human activities by interacting with applications in the same way that a person does, thus having the potential to improve work productivity and reducing human error.

In some examples, RPA can automate complex scenarios of repetitive tasks performed on a graphical user interface. The graphical and textual content captured during the design of the robots for RPA may include sensitive data such as personal information, financial and accountability data, and so on. Such data should only be viewable and editable by specific users with permission to view this information. While such captured data is not used in RPA at runtime, RPA designers must manually remove sensitive information before sharing their designs with larger audiences for learning and training purposes. This manual procedure is tedious and error prone for complex scenarios involving a substantial amount of captured data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Robotic data obfuscation involves dynamic data masking of graphical and textual content in RPA artifacts and projects. A user may indicate textual and/or graphical content to be obfuscated in an RPA project. Textual and graphical elements of RPA artifacts and other RPA content of the RPA project corresponding to the indicated textual and/or graphical content are identified and obfuscated. The RPA project is then updated with the obfuscated content and stored. The systems and methods for dynamic data masking of graphical and textual content provided herein are highly customizable and reduce the possibility of errors. Further, once data obfuscation is established, sensitive data in projects and artifacts are automatically masked as the projects and artifacts are updated or edited.

Computing systems, methods, and computer-readable media are provided for robotic data obfuscation. A provided method comprises loading, from a first storage location, a robotic process automation project comprising captured data into a first application, wherein the captured data comprises data describing user interactions with a graphical user interface of a second application. The method further comprises identifying content in the captured data to be obfuscated to provide identified content. Thereafter, content in the captured data is obfuscated to provide obfuscated content, the obfuscated content comprising at least a portion of the identified content. The robotic process automation project is updated to replace at least the portion of the identified content with the obfuscated content to provide an updated robotic process automation project. The updated robotic process automation project is stored at a second storage location, wherein the second storage location comprises the first storage location or a storage location other than the first storage location.

The present disclosure also includes computing systems and tangible, non-transitory computer-readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

BRIEF DESCRIPTION OF THE DRAWINGS

FIG. 14 is a view of a process editor user interface during obfuscation of graphical content, according to an embodiment.

FIG. 15 is a high-level flow chart illustrating an example method for robotic data obfuscation, according to an embodiment.

DETAILED DESCRIPTION

Figure 1:
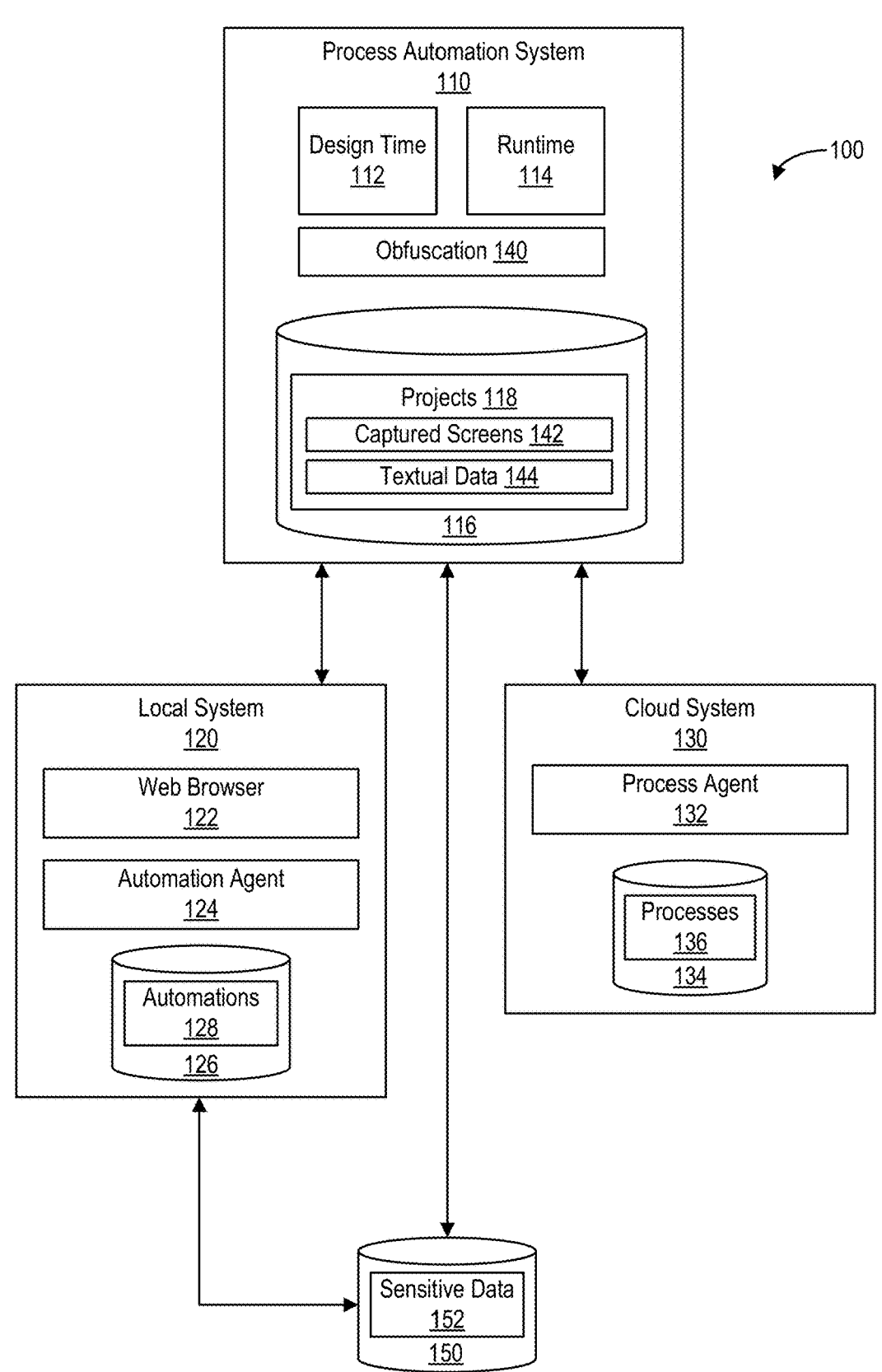
FIG. 1 is a block diagram illustrating an example system for robotic process automation, according to an embodiment.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Overview of Robotic Data Obfuscation

Robotic process automation aims to automate complex scenarios of repetitive tasks performed on a graphical user interface. RPA can be implemented as a complete automation suite where RPA software robots ("RPA bots") are configured to automate various user tasks and parts of computer-implemented processes through application user interfaces (UIs). For example, RPA bots can automate end-to-end scenarios for definable and repeatable computer-implemented processes, including mimicking human user actions by replacing manual clicks. RPA bots can also provide cross-technology UI-based automation and thus can automate user tasks across different applications by simulating user actions in the UI. To do so, RPA bots can recognize and manipulate different applications through their UIs by, for example, identifying UI elements using criteria (e.g., element of type "Button" with identifier (id) "btnOK") and manipulating the identified UI elements through several actions (e.g., performing clicks, inputting textual data).

In one example, RPA bots can contain a wealth of knowledge imparted by human experts about daily user activities and entities' computer-implemented processes. Because these experts know how their entity's computer-implemented processes work and how they should be modeled, they typically only represent a small percentage of the total workforce within any given enterprise. These experts work closely with RPA bot developers to capture their knowledge as an RPA bot that can automate a computer-implemented process.

In another example, a computer-implemented process can be modeled as an RPA bot, either by using a process recorder or an RPA bot software design tool. The computer-implemented process can include a set of functions to be performed by the RPA bot automatically, without user interaction, and across two or more different applications, such as wiki applications, word processing applications, spreadsheet applications, presentation applications, slideshow applications, diagram applications, drawing applications, email applications, database applications, any other suitable applications, or any combinations thereof.

However, there is a need for the experts' knowledge about the computer-implemented process to be shared or captured in a transparent way. Further, modification or testing of the computer-implemented process requires the expertise of both the expert and the RPA bot developer. For example, if a user wants to understand a designed RPA bot, the user would need to install and become familiar with all required software before even starting to investigate the RPA bot specifics. In addition, although most RPA design software offers graphical design tools, RPA bots are still very hard to understand for a non-technical user.

When considering the RPA bot development and sharing community, the wealth of knowledge captured in RPA bots becomes substantial and spans across multiple industries. However, that knowledge typically remains stored in a way that only experts can make use of, critically limiting that knowledge's re-use in different scenarios, optimization of processes, and benchmarking the effectiveness and implementation of process automation against industry best practices.

One approach to solving these technological problems comprises utilizing RPA bot content (e.g., RPA data) to generate (e.g., automatically and without user interaction; or with user interaction) modified RPA bot content for use in providing enhanced computer-implemented processes and documentation, including interactive screen guide data (e.g., interactive screen guides), interactive element-based documentation data (e.g., in-product contextual documentation), and structured documentation data (e.g., offline process documentation). The automatically generated modified RPA content can then be used for, for example: onboarding new users; generating and delivering learning content through the RPA channels; generating and delivering "what's new" product updates; providing in-product contextual help; generating and delivering "live documentation" of productive RPA bots (e.g., published together with the productive RPA bot to explain the automated process); any other suitable applications; or any combination thereof. Further, because RPA bots are capable of listening and reacting to UI events, and in some embodiments, dynamically modifying UIs (e.g., modifying the document object model (DOM) in a web page), RPA bots can deliver interactive UI content that can be dynamically presented to users based on their current context. Thus, RPA bots can also deliver automatically generated interactive documentation to users.

Depending on the nature of the scenario or process being automated, the graphical content captured and the data used during the design of a robotic process automation bots (e.g., RPA bot content) and/or the generation of modified RPA bot content may contain sensitive data, including personal information (e.g., contact information, identifiers, etc.), financial and accountability data (balance sheets, invoice numbers, etc.), and more. As an illustrative and non-limiting example, an RPA bot designer may design an RPA bot configured to automate a workflow relating to onboarding new employees in a computing system, wherein personal information of the new employees may be retrieved from a database and displayed via a user interface during the workflow. Such data should only be viewable and editable by specific users having the permission to view this information. During the capturing phase of RPA bot design, where the user interactions of an expert or another user with one or more applications to perform the onboarding workflow are captured, sensitive data may be displayed in the one or more applications as the user interacts with the one or more applications. While the robotic process automations or RPA bots themselves may not ultimately include any sensitive data, these robotic process automations and modified RPA content can also be shared to a larger audience for learning and training purposes as described above. Therefore, robotic process automation builders need to carefully scan their projects and make sure they hide sensitive data before sharing them to other users.

The described technologies herein enable automation builders to obfuscate selected data easily and efficiently within an automation project, which in turn allows automation builders to rapidly share projects without compromising the security of data that may be contained within such projects. The systems and methods for dynamic data masking of graphical and textual content provided herein are highly customizable and reduce the possibility of errors. Further, once data obfuscation is established, sensitive data in projects and artifacts are automatically masked as the projects and artifacts are updated or edited.

Example 2—Overall System for Robotic Process Automation

FIG. 1 is a block diagram illustrating an example system 100 for robotic process automation design according to some embodiments. Generally, process automation system 110 provides orchestration for distributing software jobs to local system 120 for execution based on triggering initiated by cloud system 130. Process automation system 110 also provides for editing of local and cloud-based software jobs (i.e., automations and processes) using a same user interface metaphor as used to create the software jobs.

Process automation system 110 includes design time component 112 for providing user interfaces to client applications to create and edit artifacts such as automations and processes as described herein. Generally, automations and processes may be considered different artifacts and a workflow (or project, also referred to herein as an automation project or a robotic process automation project) according to some embodiments may comprise artifact types in addition to processes and automations. Design time component 112 may provide any suitable user interfaces to facilitate development of artifacts that are or become known and may provide a different editor to Web browser 122 for editing each different artifact type. Process automation system 110 may store a set of interrelated artifacts as a project 118 within storage system 116.

Local system 120 includes processor-executable program code of Web browser 122 and automation agent 124. Web browser 122 may be executed to communicate with design time component 112 of process automation system 110. A user of local system 120 may therefore manipulate user interfaces provided to Web browser 122 by design time component 112 to create and edit project artifacts. During the creation and editing of project artifacts, the process automation system 110 and/or the local system 120 may retrieve and/or transmit sensitive data 152 stored in a storage device 150, which may comprise a remote data storage device, or may in some examples comprise one or more of the storage devices 116 and 126.

Runtime component 114 of system 110 may download automations 128 of a given project 118 to local system 120 for storage in storage device 126. Automations 128 may comprise any data executable by automation agent 124 to cause local system 120 to perform intended activities. The intended activities may comprise executing one or more local applications (not shown) and instructing the one or more local applications to perform a set of tasks (e.g., extracting data from a spreadsheet, populating an e-mail with the extracted data and sending the e-mail). In some embodiments, an automation 128 may cause local system 120 to issue REST calls directly to cloud-based applications.

The activities of an automation 128 may also or alternatively comprise operating Web browser 122 to access a webpage and submit data via the accessed webpage. For each currently displaying webpage, the Web browser 122 can generate a document object model (DOM) (not shown) that represents the user interface (UI) of the webpage. The system 100 may thus be "web-based" in that it includes a DOM that typically represents a webpage, though it should be appreciated that the technologies provided herein could also be applied to other implementations. When activated, the automation agent 124 can execute one or more automations 128 to automatically identify and interact with a plurality of UI control elements in the currently displaying webpage. In practice, an automation 128 can instruct the automation agent 124 to interact with and monitor the user interface (e.g., enter values, activate graphical buttons, read fields, and the like). As described herein, an automation can refer to particular user interface elements via an identifier.

The automation agent 124 can iterate over the lines in an automation 128 to execute the automation 128 from beginning to end. The automation agent 124 can support a syntax that allows for flow control (e.g., conditional branching and the like). A first statement in the automation 128 is executed according to the syntax, and the automation agent 124 fetches and executes the next script statement in a similar manner. The automation agent 124 thus usefully automates interaction with the user interface to accomplish some supported task (e.g., performing database operations such as adding a user to a database, performing administrative functions such as approving a leave request, performing information services functions such as running a backup, or the like).

Cloud system 130 includes processor-executable program code of process agent 132. Runtime component 114 of system 110 may provide processes 136 to cloud system 130 from projects 118 for execution thereby. Processes 136 may comprise any data executable by process agent 132 to cause cloud system 130 to perform intended actions. Such actions may comprise but are not limited to detection of an event. Upon detection of such an event, runtime component 114 may trigger execution of a corresponding one or more automations 128 by automation agent 124.

Process automation system 110 further includes an obfuscation module 140 configured to selectively obfuscate data stored in the storage device 116, such as sensitive data contained within one or more projects 118 according to some embodiments. For example, a project 118 may include, as illustrative and non-limiting examples: a set of functions; a set of electronic elements; a set of electronic element descriptions; a set of electronic definitions (e.g., flow definitions); a set of captured screens 142 (e.g., screenshots); data collected from one or more systems, applications, or databases, including but not limited to textual data 144; generated data; data flow; actions; element criteria and descriptions; any other suitable data or electronic information; or any combination thereof for automating one or more computer-implemented processes, tasks, or actions. As will be described in detail below, obfuscation module 140 may scan projects 118 (i.e., sets of related artifacts) and edit such projects 118 to visually mask graphical user interface elements (e.g., captured screens 142) of artifacts, anonymize textual content (e.g., textual data 144) of artifacts, and/or otherwise obfuscate at least a portion of a user interface element. Specifically, the obfuscation module 140 may edit one or more of the captured screens 142 and the textual data 144 to remove, replace, blur, or otherwise obfuscate any sensitive data 152 that may be captured in the captured screens 142 and/or the textual data 144 during the creation and/or editing of projects 118. In this way, automations 128 and processes 136 may be generated from projects 118 and interactive learning content (not shown) generated from projects 118 may be shared without including any sensitive data 152. Further, as described further herein below, the obfuscation module 140 obfuscates sensitive data 152 in captured screens 142 and/or textual data 144 without compromising the ability for automations 128 and processes 136 to be generated from the projects 118. Advantageously, both design time component 112 and runtime component 114 may interface with obfuscation module 140 to facilitate usage of a design time artifact editing user interface for obfuscating data in a project.

According to some embodiments, process automation system 110 communicates with many different local systems to facilitate editing of artifacts thereby and to orchestrate execution of automations thereon. Similarly, embodiments are not limited to a single cloud system for execution of processes.

Each of systems 110, 120 and 130 may comprise any suitable combination of hardware and/or software, such as the computing systems described below (e.g., processing units, memory, and the like). Any components described herein may be implemented using a distributed storage system and/or distributed nodes for performing computing operations as is known in the art. In any of the examples herein, the instructions for implementing any components of the system 100, along with the input, output, and intermediate data of running the system 100 (e.g., the data pertaining to DOM, the properties of UI control elements, and so on), and the like can be stored in one or more computer-readable storage media or computer-readable storage devices. The technologies described herein can be generic to the specifics of operating systems or hardware and can be applied in any variety of environments to take advantage of the described features.

Example 3—Robotic Process Automation Design Architecture

Figure 2:
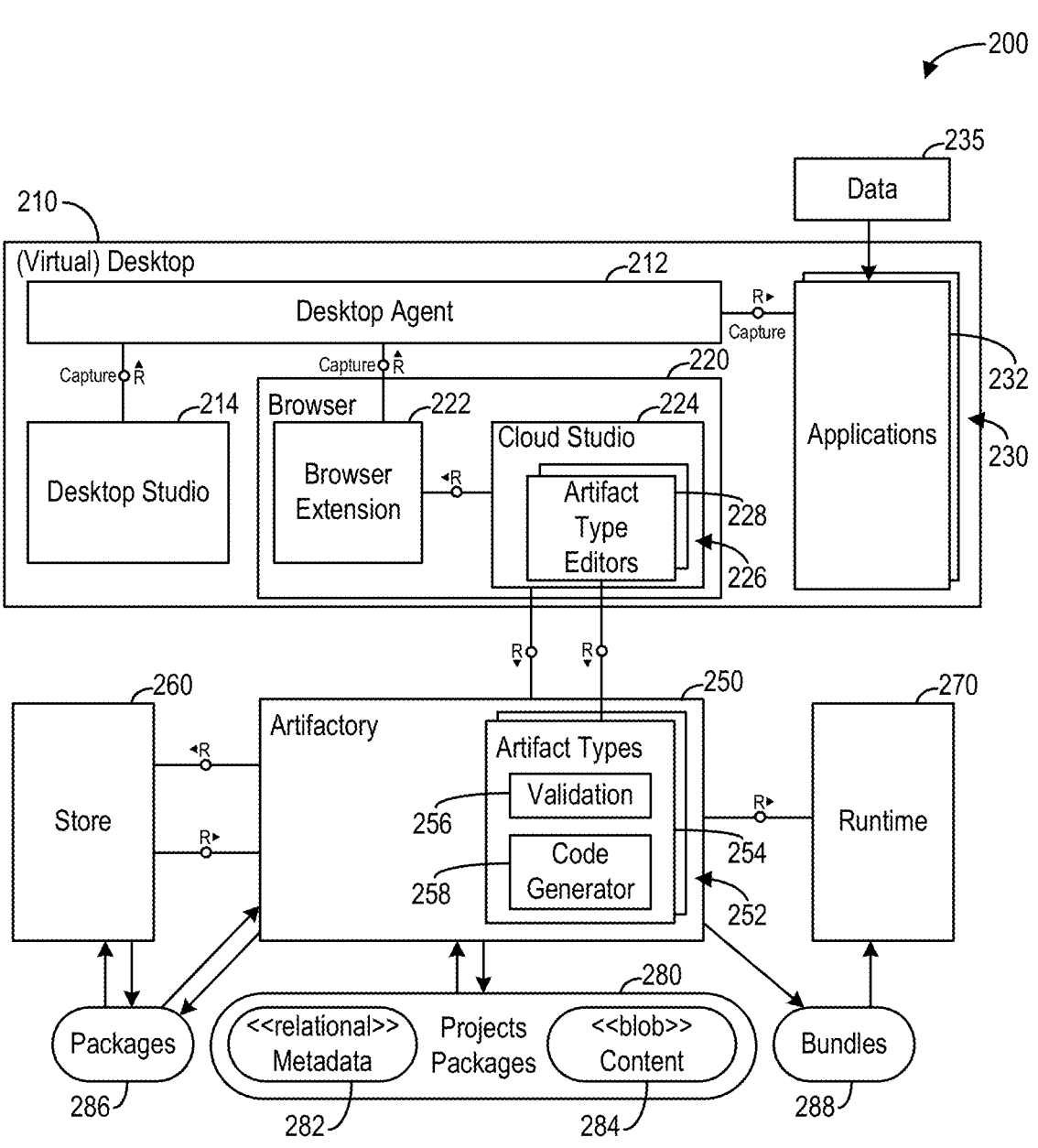
FIG. 2 is a block diagram illustrating an example architecture for robotic process automation design, according to an embodiment.

FIG. 2 shows a block diagram illustrating an example architecture 200 for robotic process automation design. For application automation, a developer can capture application screens and/or user interface elements of one or more applications 230, such as application 232, via a desktop agent 212 using a desktop studio 214 of desktop 210. The application screens and/or user interface elements may include sensitive data retrieved from a data source 235, which may be locally or remotely located. The application screens and/or user interface elements of the application 232 may also be captured via a cloud studio 224 via a browser extension 222 in a Web browser 220 of the desktop 210. The cloud studio 224 may include a plurality of artifact type editors 226, including artifact type editor 228, for each artifact type (e.g., projects, automations, processes, and so on) as an illustrative and non-limiting example. During a pre-requisite phase, an automation project can be initiated and an application 232 can be launched to capture. During a capture phase, application screens and/or user interface elements can be captured. Application screens and its user interface elements can be defined, during a declaration phase, which can be used for building an autonomous program. The declared application screens and its user interface elements can be used through a workflow or script, during a design phase, for covering a regular end-user workflow. During a validation and test phase, application screens and its user interface elements can be monitored and/or controlled. Additionally, during the validation and test phase, the workflow can be played to ensure it is operating as expected. During a packing phase, a workable solution can be generated. That workable solution can be imported during the orchestration phase. During a pre-orchestration phase, a package can be imported. Additionally, during the pre-orchestration phase, triggers or start conditions for deployment can be defined. During an orchestration phase, a deployed package can be run based on a trigger. During a result phase, one or more execution results of a deployed package can be returned.

The cloud studio 224 interfaces with the artifactory 250 or artifact repository. Specifically, the artifact type editors 226 store artifact types 252, including an artifact type 254, from the capture phase in an artifactory 250 or artifact repository, and the artifact type editors 226 further may edit the artifact types 252. Packages 286 may be generated from storage 260 and the artifactory 250. The artifactory 250 further interfaces with projects and packages 280 including metadata 282 stored as relational data and content 284 (e.g., textual data) stored as a binary large object (blob). Generally, as mentioned above, automations and processes may be considered different artifacts and a workflow or project may comprise artifact types in addition to processes and automations. Validation 256 and code generators 258 interface with the artifact types 252 to validate the artifact types 252 as well as to generate code (e.g., for packages, bundles, projects, and so on). As discussed hereinabove, the runtime component 270 may provide processes or bundles 288 for execution thereby.

Each artifact is stored in the robotic process automation system. Patterns for obfuscation are defined as discussed further herein and stored in the system in extension of these artifacts. Therefore, all the found instances will be substituted and the original project will be replaced with a new compliant project.

Example 4—Artifact Workflow

Figure 3:
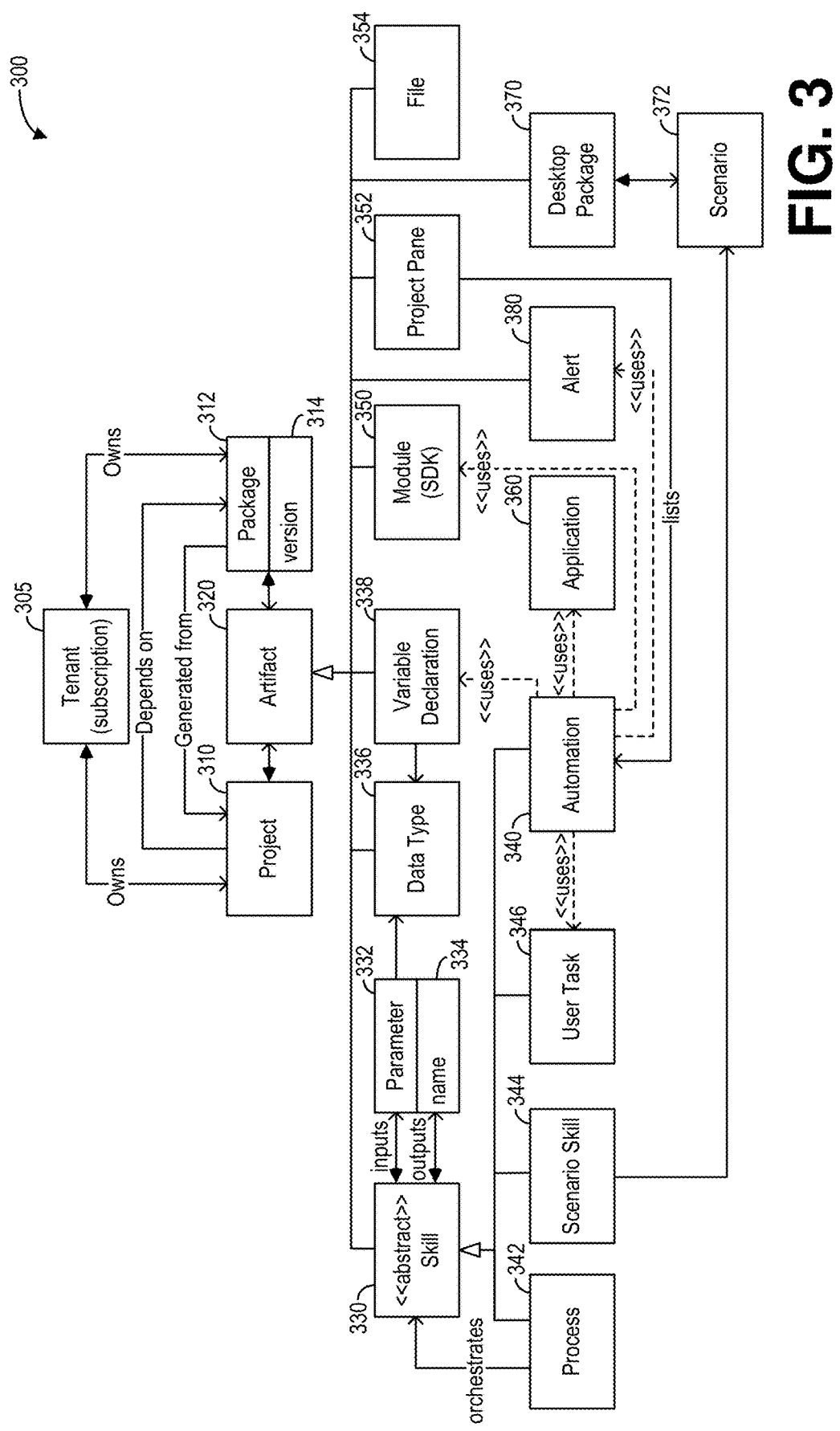
FIG. 3 is a block diagram illustrating an example artifact structure, according to an embodiment.

FIG. 3 shows a block diagram illustrating an example artifact workflow 300. A tenant 305 is the owner of a project 310 and a package 312 with version 314. The package 312 depends on the project 310, while the project 310 is generated from the package 312. An artifact 320 is the basis for both projects 310 and packages 312. The artifact 320 incorporates an abstracted skill 330, which interfaces with parameters 332 for inputs and names 334 for output. The artifact 320 further incorporates data type 336, variable declaration 338, a module 350, a project pane 352 (e.g., listing automations), a file 354 (e.g., screen captures or screenshots), a desktop package 370, and an alert 380. An automation 340 uses the variable declaration 338, a user task 346, an application 360, and an alert 380. A process 342 orchestrates the skill 330, which incorporates the process 342, a scenario skill 344, user task 346, and the automation 340. The scenario skill 344 yields the scenario 372, which in turn interfaces with the desktop package 370.

Example 5—Method for Robotic Data Obfuscation

Figure 4:
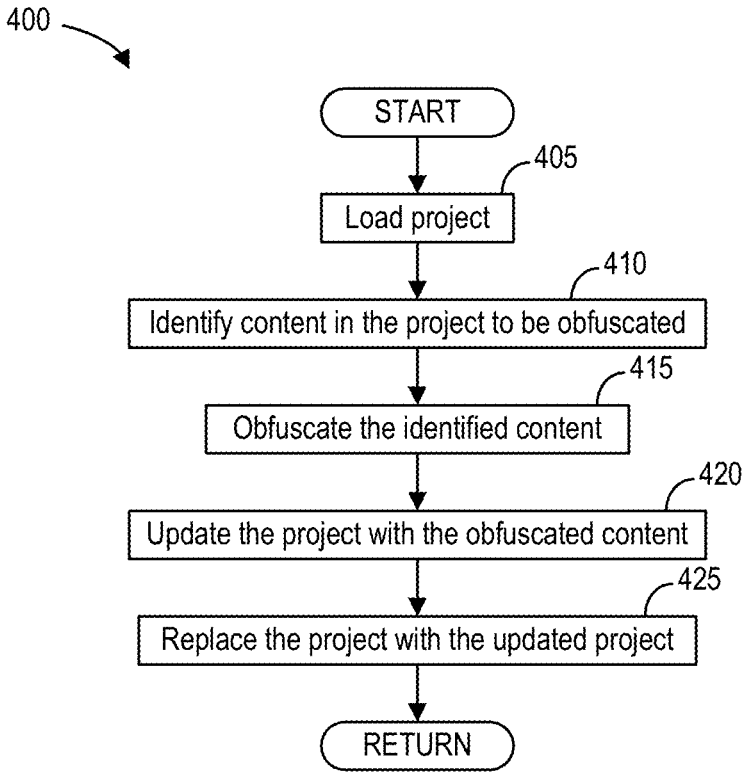
FIG. 4 is a high-level flow chart illustrating an example method for robotic data obfuscation, according to an embodiment.

FIG. 4 shows a high-level flow chart illustrating an example method 400 for robotic data obfuscation, according to an embodiment. Specifically, method 400 relates to dynamic data masking for graphical user interface and textual content in robotic process automation design. Method 400 is described with regard to the systems and components of FIGS. 1-3, though it should be appreciated that the method 400 may be implemented with other systems and components without departing from the scope of the present disclosure.

Method 400 begins at 405. At 405, method 400 loads a project comprising at least one artifact. Method 400 may load the project into accessible memory, for example, and further may load the project into an application for robotic process automation design.

At 410, method 400 identifies content in the project to be obfuscated. The content may comprise graphical and/or textual content. In some examples, method 400 may identify graphical content in one or more artifacts of the project to be obfuscated. Specifically, method 400 may identify at least one user interface element in at least one artifact of the project, such as in a captured screen (i.e., screenshot), to be obfuscated. Additionally or alternatively, method 400 may identify textual content in the project to be obfuscated. For example, in examples wherein a project is directed to automating interactions with a webpage, the project may comprise a DOM for the webpage and such DOM may include text displayed via the webpage to be obfuscated. Method 400 may therefore scan the DOM of the webpage to identify the presence of content to be obfuscated. Further still, in some examples, method 400 may identify textual content in graphical user interface elements, for example by processing the graphical user interface elements with optical character recognition. Method 400 may identify content in the project to be obfuscated based on an obfuscation definition received from a user. The user may manually input an obfuscation definition via a process automation editor user interface or an associated dialog box as described further herein. For example, the user may provide an obfuscation definition comprise one or more keywords, keyword patterns, regular expressions (i.e., a sequence of characters specifying a search pattern in text), identifications of particular user interface elements, and/or coordinates defining an area of a captured screen to be obfuscated. Additionally or alternatively, in some examples, method 400 may automatically identify content in the project to be obfuscated, for example based on an obfuscation definition stored in non-transitory memory. Method 400 may automatically identify content in the project to be obfuscated responsive to the project being loaded, updated, refreshed, edited, and so on.

At 415, method 400 obfuscates the identified content. For example, method 400 may mask the identified content by visually obscuring the identified content, in instances wherein the identified content is graphical content in a captured user interface element. As an illustrative example, method 400 may blur the identified content in a captured screen or screenshot of an application so that the identified content is not recognizable in the updated captured screen. In instances wherein the identified content is textual content, method 400 may substitute the identified content with an anonymous and/or random value, or method 400 may tokenize the identified content by generating a new value from the identified content and replacing the identified content with the generated new value.

At 420, method 400 updates the project with the obfuscated content. For example, method 400 may replace the captured screen of the project with the updated captured screen with the identified graphical content blurred or otherwise obfuscated. Additionally or alternatively, method 400 may replace one or more artifacts of the project comprising identified textual content with obfuscated textual content (e.g., substituted text, tokenized text, and so on). At 425, method 400 replaces the project as stored in memory with the updated project. In this way, method 400 overwrites the project with the updated project. Method 400 then returns. Dynamic data masking for graphical user interfaces and textual content in projects and artifacts in this way allows robotic process automation designers to hide sensitive data easily and quickly before sharing the completed automations with others who may not have privileges to view such sensitive data. Further, while methods for obfuscating textual content and graphical content are described separately hereinbelow, it should be appreciated that the technology provided herein enables users to obfuscate both textual and graphical content in a same robotic process automation project.

Example 6—Method for Obfuscating Textual Content

Figure 5:
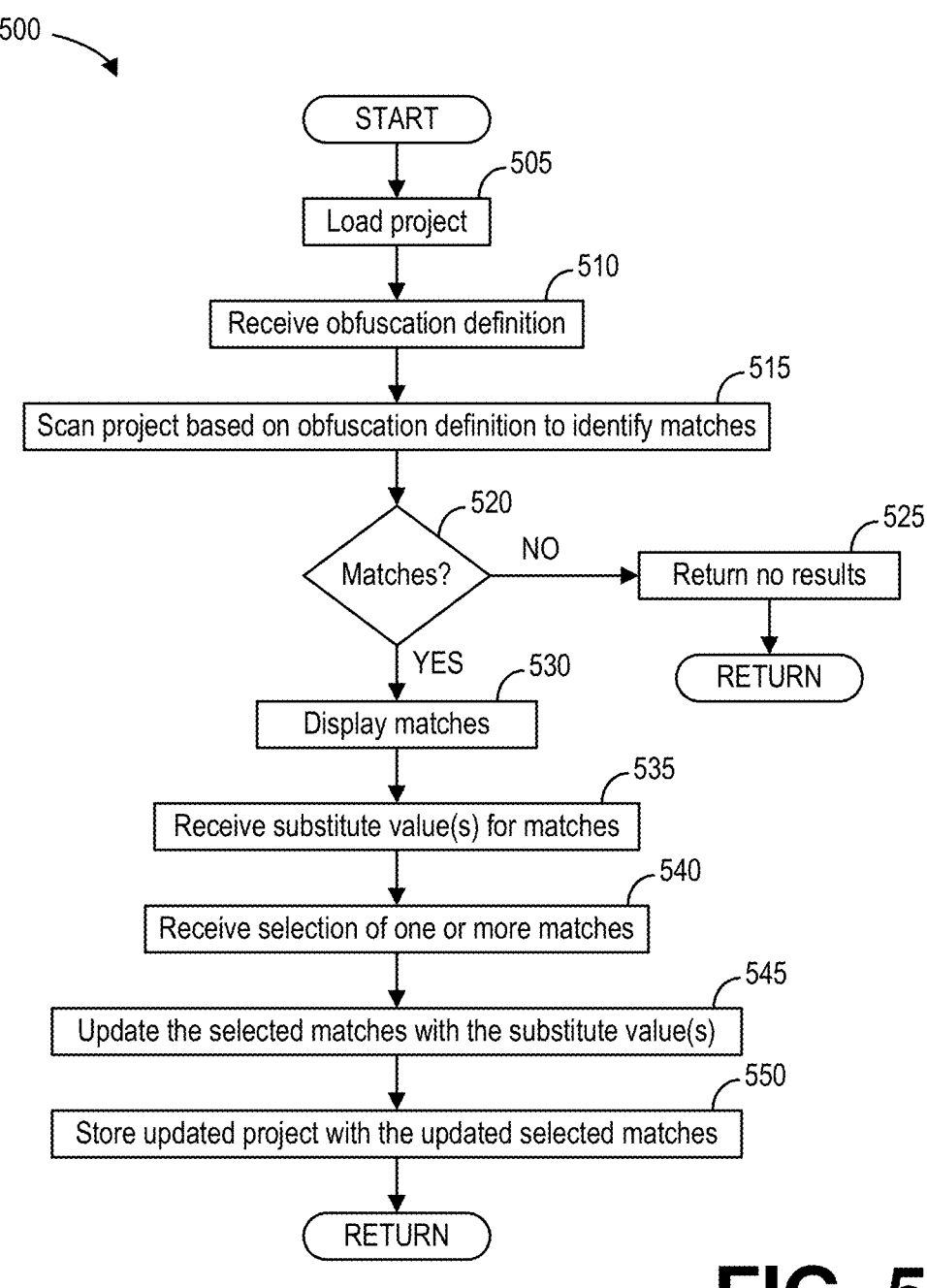
FIG. 5 is a high-level flow chart illustrating an example method for robotic data obfuscation of textual content, according to an embodiment.

FIG. 5 shows a high-level flow chart illustrating an example method 500 for robotic data obfuscation of textual content. Specifically, method 500 relates to scanning a project to identify textual content for obfuscation, and selectively masking identified textual content. Method 500 is described with regard to the systems and components of FIGS. 1-3, though it should be appreciated that the method 500 may be implemented with other systems and components without departing from the scope of the present disclosure.

Method 500 begins at 505. At 505, method 500 loads a project. The project may comprise a project or automated workflow containing one or more artifacts such as a set of interrelated artifacts. The project may be completed, though it should be appreciated that a user may be actively creating and/or editing the project when the project is loaded. The project may comprise textual content which may or may not include sensitive data. For example, in instances wherein the project is directed to automating interactions with a webpage, the project may comprise, in part, a DOM including textual content displayed on the webpage (e.g., in text nodes of the DOM). When loading the project, method 500 may load all textual content of the project as a binary large object (blob), as an illustrative and non-limiting example. In this way, one or more string searches of the textual content may be rapidly performed.

At 510, method 500 receives an obfuscation definition. An obfuscation definition comprises one or more keywords and/or one or more patterns of keywords to be obfuscated. The obfuscation definition may further comprise a textual type as described further herein. Method 500 may receive the obfuscation definition from a user via a user input device, as an illustrative and non-limiting example. As another example, method 500 may automatically retrieve the obfuscation definition from storage, for example, responsive to the project being updated, refreshed, or loaded.

At 515, method 500 scans the project based on the obfuscation definition to identify matches. For example, method 500 may perform a string search of the textual content of the project via a suitable string search algorithm. In addition to search the textual content itself to identify matches, method 500 may also identify certain metadata for any identified matches, such as the particular artifact containing the matching text, the particular user interface element containing the matching text, and so on. For example, when method 500 identifies a match in a text node of a DOM, method 500 may identify the matching text in the text node, as well as text within the text node adjacent to the matching text, the particular user interface element containing the text node, and so on.

At 520, method 500 determines whether any matches were identified during the scan. If no matches were identified ("NO"), method 500 continues to 525, where method 500 returns no results. Method 500 then returns. However, if at least one match was identified ("YES"), method 500 proceeds to 530. At 530, method 500 displays all matches identified to the user. Method 500 may further display any metadata associated with an identified match, such as the artifact containing the matching text, the user interface element containing the matching text, and so on. Further, method 500 may display text that is immediately adjacent to the matching text. In this way, the user may evaluate the match in view of its metadata to determine whether to obfuscate the matching text.

At 535, method 500 receives one or more substitute values for the identified matches. Method 500 may receive the one or more substitute values from a user via user input, for example, or alternatively method 500 may retrieve the one or more substitute values from storage. Further, at 540, method 500 receives a selection of one or more matches of the identified matches. For example, the user may select one or more matches of the identified matches while not selecting one or more other matches of the identified matches. The user may also select all identified matches for obfuscation.

At 545, method 500 updates the one or more selected matches with the one or more substitute values. For example, method 500 replaces the matching text of the one or more selected matches with the one or more substitute values. After updated the selected matches with the selected substitute value(s), at 560, method 500 stores the updates project with the updated selected matches. The updated project with obfuscated data may therefore replace the original project. Method 500 then returns.

Figure 6:
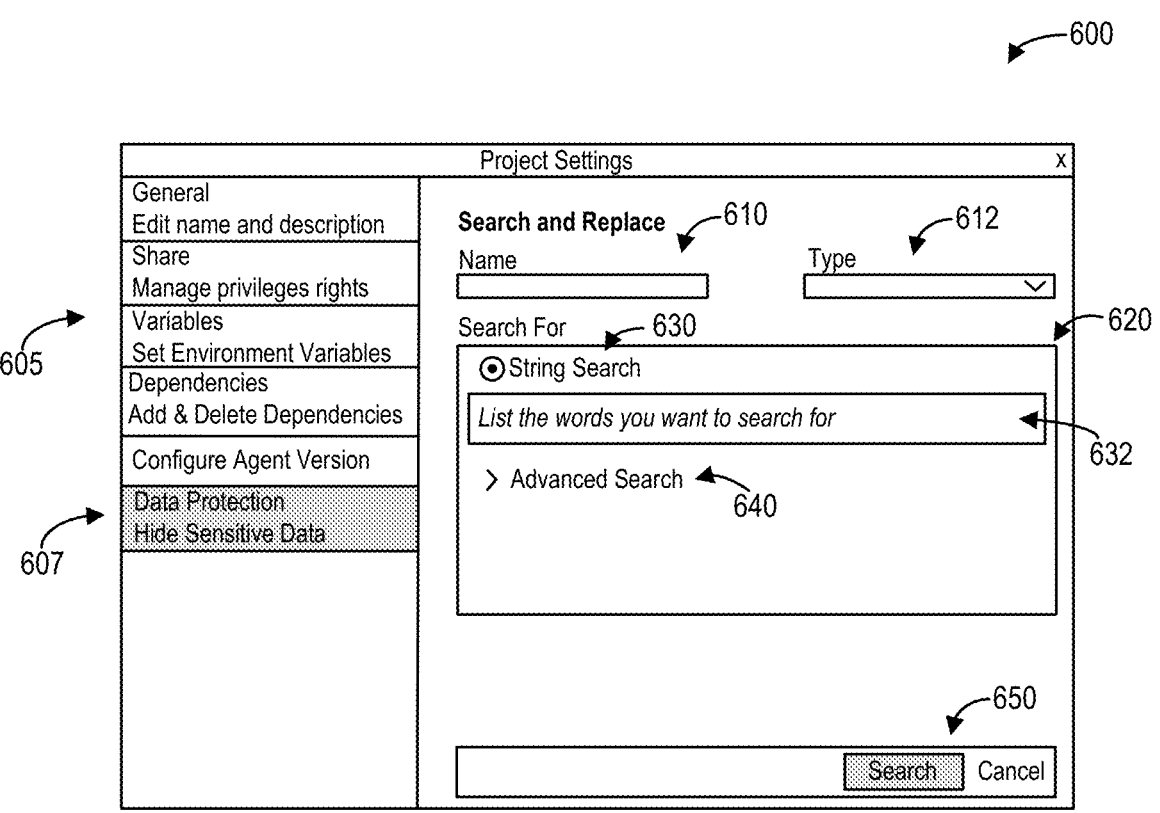
FIG. 6 is a view of a process editor user interface during obfuscation of textual content, according to an embodiment.

As an illustrative and non-limiting example, FIG. 6 shows an example process editor user interface 600 during obfuscation of textual content, according to an embodiment. The user interface 600 may comprise a dialog box generally configured to allow a user of the process editor to adjust settings for a project. To that end, the user interface 600 may include a plurality of tabs 605, with each tab associated with a different aspect of project settings, including a tab 607 associated with data protection via data obfuscation. As depicted, the tab 607 is selected and active in the user interface 600. The user interface 600 thus depicts a "Search and Replace" function.

The user interface 600 includes a plurality of input fields, including: a Name input field 610 configured to receive textual input from a user regarding a desired name for the search, so that the search may be easily repeated by the user for one or more projects including the present project; a Type input field 612 comprising a drop-down menu populated with a plurality of types of text that may be candidates for obfuscation; a Search input field 620 including options for a String Search 630 with an associated text input field 632 for performing a string search, and an Advanced Search field 640 comprising an expandable menu populated with advanced search options corresponding to predetermined regular expressions; and a Search button 650 configured to execute a search of the project based on the various inputs. The predetermined regular expressions may comprise, for example, predetermined sequences of characters that specify search patterns in text. For example, a predetermined regular expression may be configured to identify textual content corresponding to an e-mail address, another predetermined regular expression may be configured to identify URLs, another predetermined regular expression may be configured to allow a search for a keyword pattern including operators, and so on. By using predetermined regular expressions in this way, more complex and/or more general searches may be performed without interfering with the underlying automation design, for example by inadvertently replacing textual content associated with or necessary to the automation design.

Figure 7:
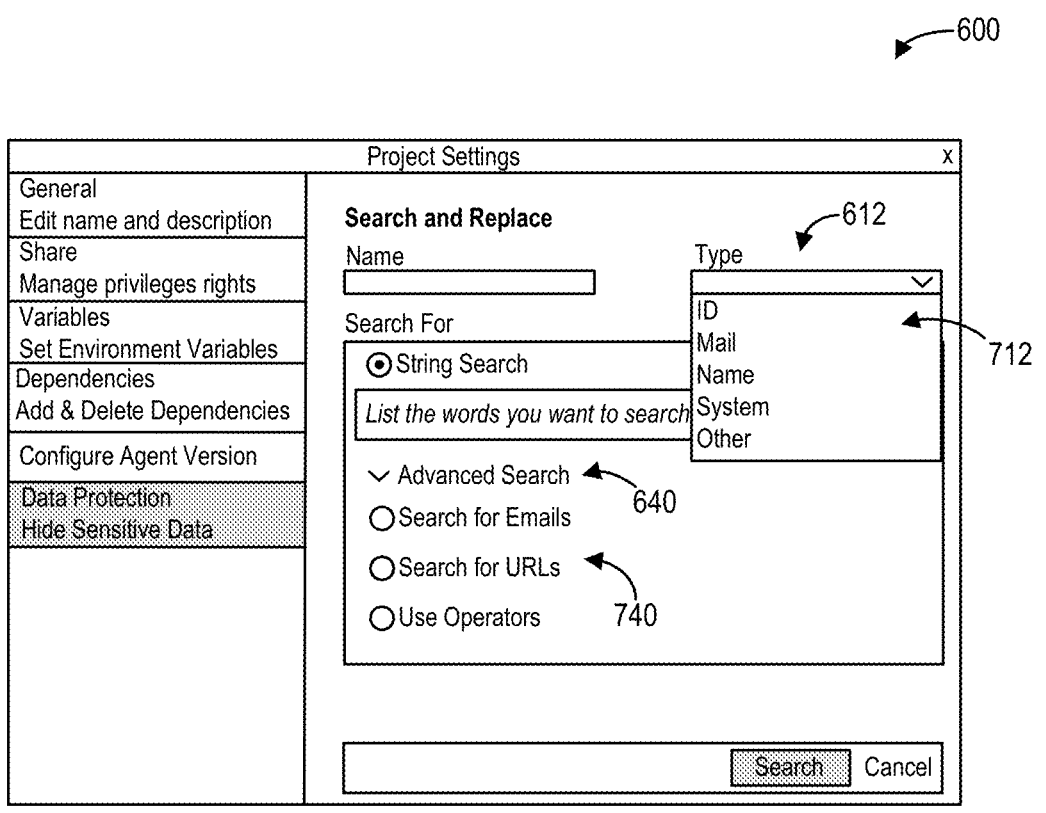
FIG. 7 is a view of a process editor user interface during obfuscation of textual content, according to an embodiment.

As depicted in FIG. 7, the Type input field 612 when expanded shows a list 712 of types of text for obfuscation, such as identification (ID), mail (e.g., physical mailing address and/or e-mail address), name, system, and other. As further depicted in FIG. 7, the Advanced Search field 640 when expanded shows a list 740 of advanced search options corresponding to predetermined regular expressions. For example, the Advanced Search field 640 allows a user to search specifically for e-mail addresses or URLs, or using certain operators using predetermined regular expressions such that the input and/or output of the obfuscation does not interfere with other functions of the robotic process automation.

Figure 8:
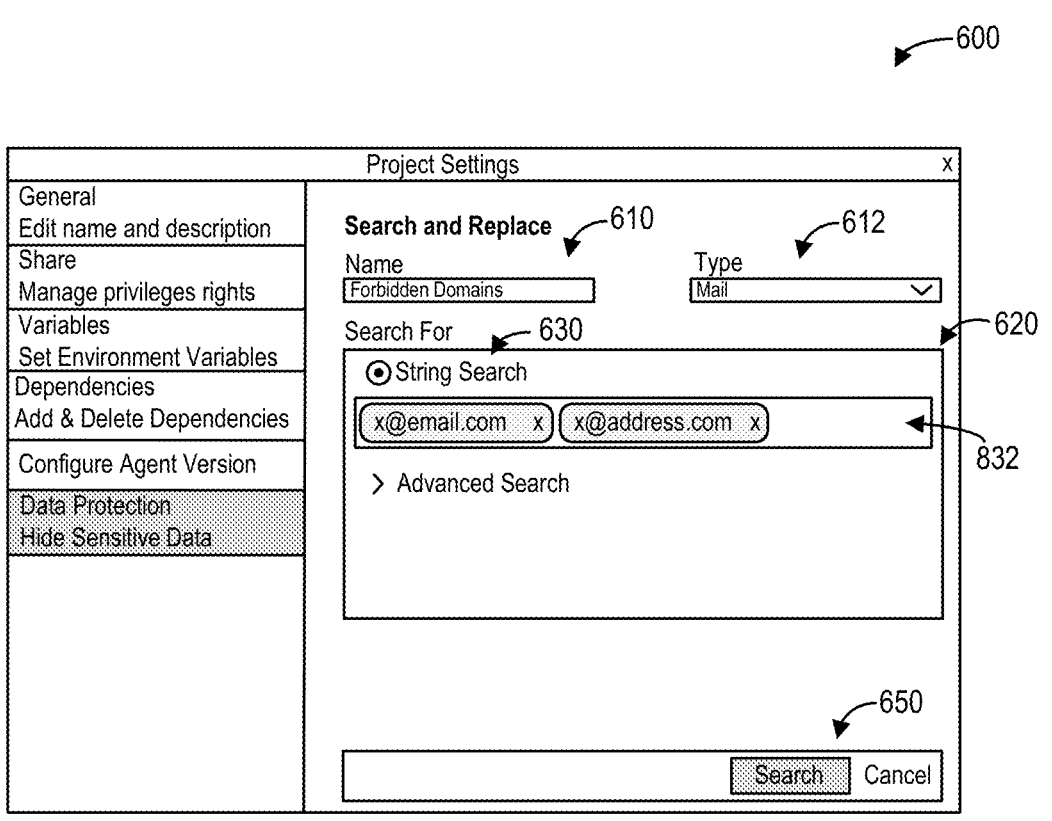
FIG. 8 is a view of a process editor user interface during obfuscation of textual content, according to an embodiment.

As depicted in FIG. 8, one or more patterns of keywords 832 may be input to the text input field 632 of the String Search 630. The selection of a type from the Type input field 612 may enable the use of a particular pattern in the text input field 632. For example, the selection of "Mail" as the type specifies certain textual search patterns for e-mail, such that "x@email.com" is a search throughout the project for any e-mail address with "email.com" as the domain. The Type input field thus provides a faster and more accessible technique for searching for e-mail addresses without the need for expressly writing regular expressions, as an illustrative and non-limiting example.

Further, the text input field 632 may allow a user to import a plurality of keywords or patterns of keywords at once, for example via copy and pasting a list of keywords and/or patterns of keywords from another document. In this way, users can construct obfuscation searches with large numbers of predetermined keywords.

Figure 9:
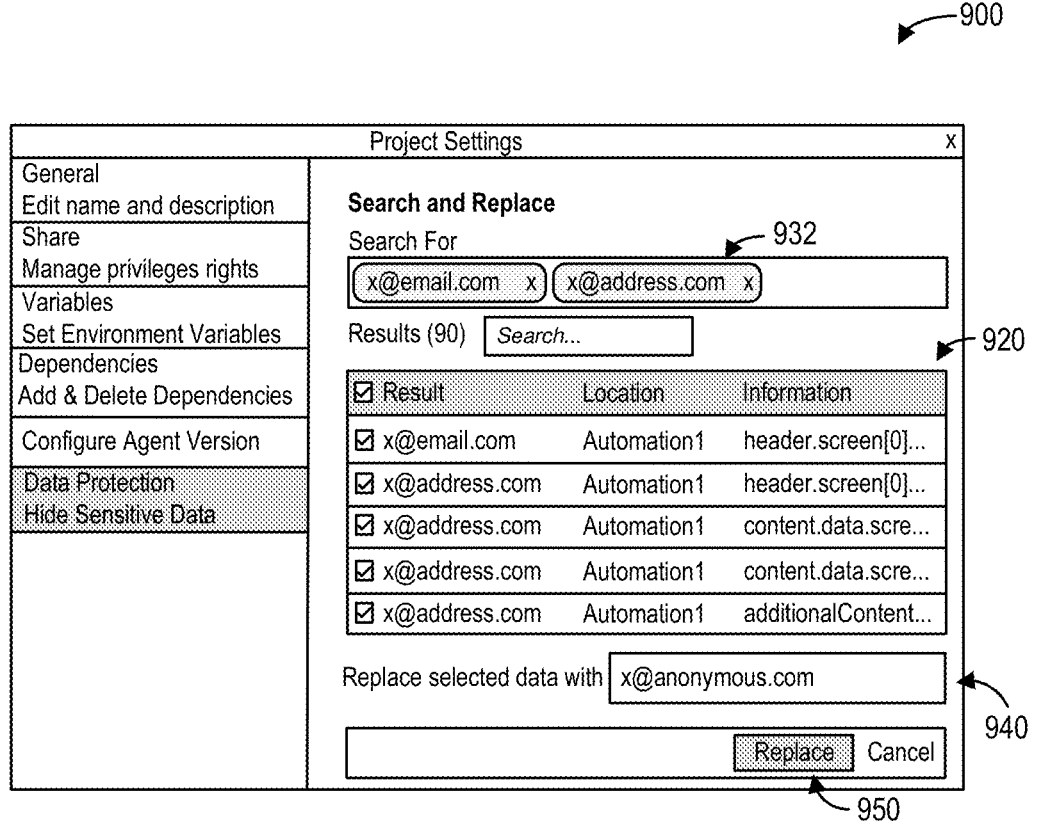
FIG. 9 is a view of a process editor user interface during obfuscation of textual content, according to an embodiment.

Once an obfuscation search is constructed and the user clicks or otherwise executes the search button 650, the systems described herein search all textual content of the project to determine whether any textual content matches any of the search terms. FIG. 9 shows an example process editor user interface 900 after executing an obfuscation search as described herein. The user interface 900 shows the one or more keywords or keyword patterns 932 for the search, as well as one or more results 920. In the depicted illustrative and non-limiting example, ninety results were identified, and a user may search the results or filter the results based on location, information, specific keyword of the list of keywords 932, and so on.

The results 920 show the result of the search, which may show the matching text itself along with adjacent text (e.g., text before and/or after the matching text in order to provide context), a location of the matching text within the project (e.g., specifying a specific artifact within the project), and information relating to the matching text (e.g., an identifier of a particular user interface element containing the matching text). These results 920 may be obtained from a DOM, for example. The user interface 900 further includes a text input field 940 configured to accept substitute text or values (e.g., "x@anonymous.com" in the depicted example). A user may thus review the one or more results yielded by the obfuscation search, and may use the context information (e.g., adjacent text, artifact location, user interface element, and so on) to authenticate whether a particular result should be replaced. After selecting one or more results and inputting at least one substitute value, the user may execute the replacement of the selected results with the at least one substitute value by pressing or otherwise engaging the Replace button 950.

The selected results are then replaced with the at least one substitute value. The task is thus complete for the data obfuscation of the selected results. The system stores the patterns, which may be retrieved and edited via the name selected in the Name input field 610. Further, as the system stores the patterns, the system automatically hides any new input data that matches the pattern(s) and obfuscates all new instances every time a user refreshes the page.

Example 7—Method for Obfuscating Graphical Content

Figure 10:
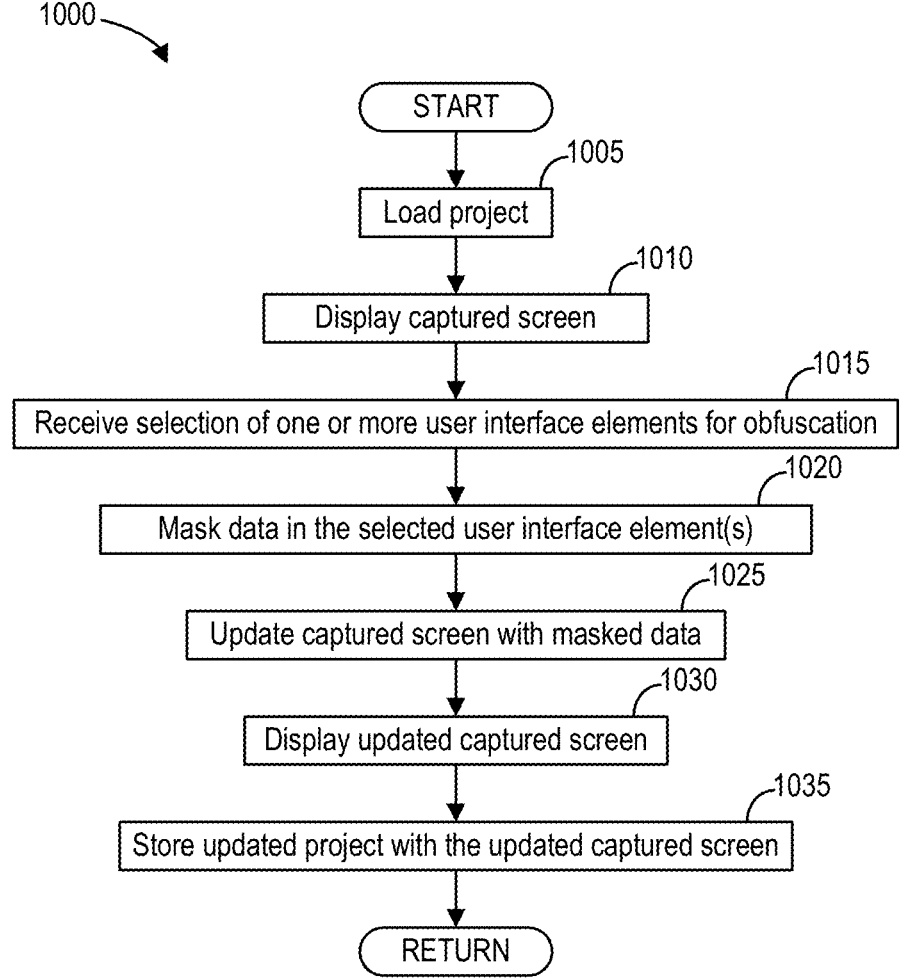
FIG. 10 is a high-level flow chart illustrating an example method for robotic data obfuscation of graphical content, according to an embodiment.

FIG. 10 shows a high-level flow chart illustrating an example method 1000 for robotic data obfuscation of graphical content. Specifically, method 1000 relates to selectively masking one or more user interface elements in a graphical user interface to obfuscate content of the one or more user interface elements. Method 1000 is described with regard to the systems and components of FIGS. 1-3, though it should be appreciated that the method 1000 may be implemented with other systems and components without departing from the scope of the present disclosure.

Method 1000 begins at 1005. At 1005, method 1000 loads a project. The project may comprise a project or automated workflow containing one or more artifacts such as a set of interrelated artifacts. The project may be completed, though it should be appreciated that a user may be actively creating and/or editing the project when the project is loaded. Method 1000 in particular loads one or more captured user interface elements of a project. At 1010, method 1000 displays a captured screen of the project, for example, within a robotic process automation design application. The captured screen comprises an image of a captured graphical user interface.

At 1015, method 1000 receives a selection of one or more user interface elements for obfuscation. Method 1000 receives a selection of the one or more user interface elements for obfuscation, for example, via user input. For example, a user may select a masking tool that allows the user to drag a cursor across the captured screen to select one or more user interface elements depicted in the captured screen. As an illustrative and non-limiting example, method 1000 may receive the selection as a set of coordinates, such as a first coordinate (x1, y1) and a second coordinate (x2, y2), defining an area (such a box, or rectangle) of the captured screen. In examples wherein the captured screen is simply an image of the graphical user interface, the defined area specifies an area of the image of the graphical user interface to be obfuscated. In other examples, method 1000 may identify the one or more user interface elements contained with this defined area, in some examples, or may identify the one or more user interface elements at least partially overlapping with this defined area, in other examples. For example, a DOM associated with the captured screen may specify the location of the one or more user interface elements in the captured screen (e.g., via coordinates). Method 1000 may therefore identify the one or more user interface elements contained within the defined area based on coordinates of the one or more user interface elements as defined in the DOM occurring with the defined area. In this way, a user may visually select the one or more user interface elements for obfuscation. Additionally or alternatively, method 1000 may receive the selection of one or more of the one or more user interface elements through a direct specification of the one or more user interface elements, as described further herein. For example, the user may select the one or more user interface elements from a pane listing one or more user interface elements including the one or more user interface elements.

At 1020, method 1000 masks data in the one or more selected user interface elements. For example, method 1000 may blur the graphical data in the one or more selected user interface elements by blurring portions of the image of the graphical user interface corresponding to the one or more selected user interface elements. Alternatively, method 1000 may process the one or more selected user interface elements and selectively blur only a portion of the one or more selected user interface elements containing textual data. In other examples, method 1000 may apply optical character recognition to at least the one or more selected user interface elements in the captured screen to obtain at least one text string. Method 1000 may then tokenize textual data within the obtained text string(s) or otherwise modify the textual data to mask the data in the one or more selected user interface elements. In any of these examples, method 1000 obfuscates data in the one or more selected user interface elements. At 1025, method 1000 updates the captured screen with the masked data, and at 1030, method 1000 displays the updated captured screen. In this way, the user may review how the data is obfuscated, undo the obfuscation if desired, or extend the obfuscation further if the obfuscation is insufficient.

Continuing at 1035, method 1000 stores the updated project with the updated captured screen. Method 1000 thus replaces the project with the updated project. Method 1000 then returns.

Figure 11:
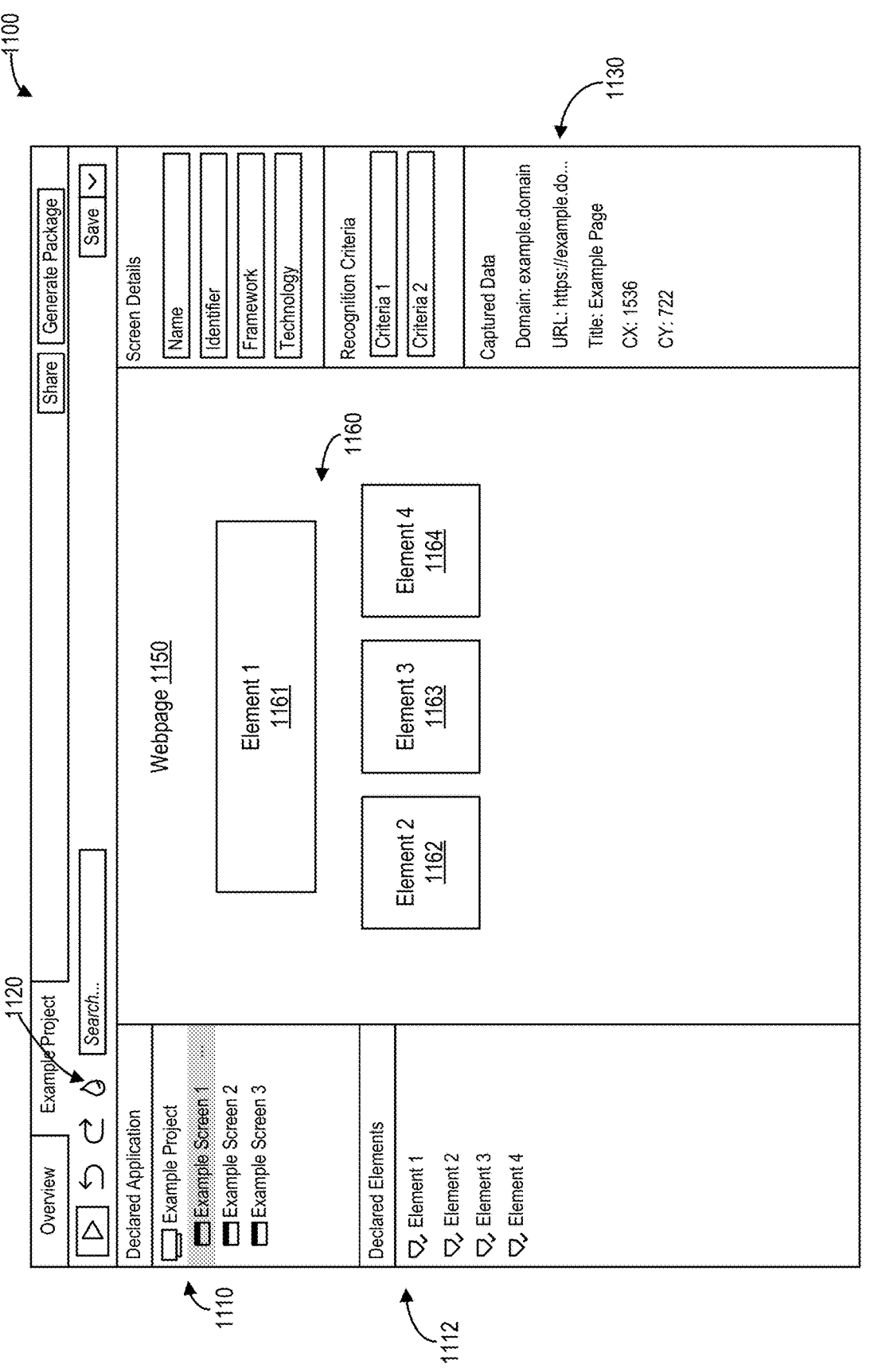
FIG. 11 is a view of a process editor user interface during obfuscation of graphical content, according to an embodiment.

As an illustrative and non-limiting example, FIG. 11 shows a view of an example robotic process editor user interface 1100 during obfuscation of graphical content, according to an embodiment. Process editor user interface 1100 may comprise a webpage provided by design time component 112 to Web browser 122 for display by local system 120. The robotic process editor user interface 1100 may be displayed by a dedicated client application for which design time component 112 is a corresponding server application.

In some embodiments, a user may manipulate the robotic process editor user interface 1100 to create and edit project artifacts such as automations. Robotic process editor user interface 1100 thus includes a Declared Application pane 1110 indicating the individual artifacts of a given project, as well as a Declared Elements pane 1112 indicating the individual user interface elements. The declared application screens and its user interface elements can be used through a workflow or script, during a design phase, for covering a regular end-user workflow. As depicted in the illustrative and non-limiting example, the selected Example Screen 1 of the Example Project corresponds to a webpage 1150 containing a plurality of user interface elements 1160, including at least a first user interface element (Element 1) 1161, a second user interface element (Element 2) 1162, a third user interface element (Element 3) 1163, and a fourth user interface element (Element 4) 1164. The user interface 1100 further displays additional information, such as screen details relating to the captured screen, and recognition criteria for user interface elements. A captured data pane 1130 displays all captured data relating to the captured screen, including captured data relating to one or more user interface elements.

Figure 12:
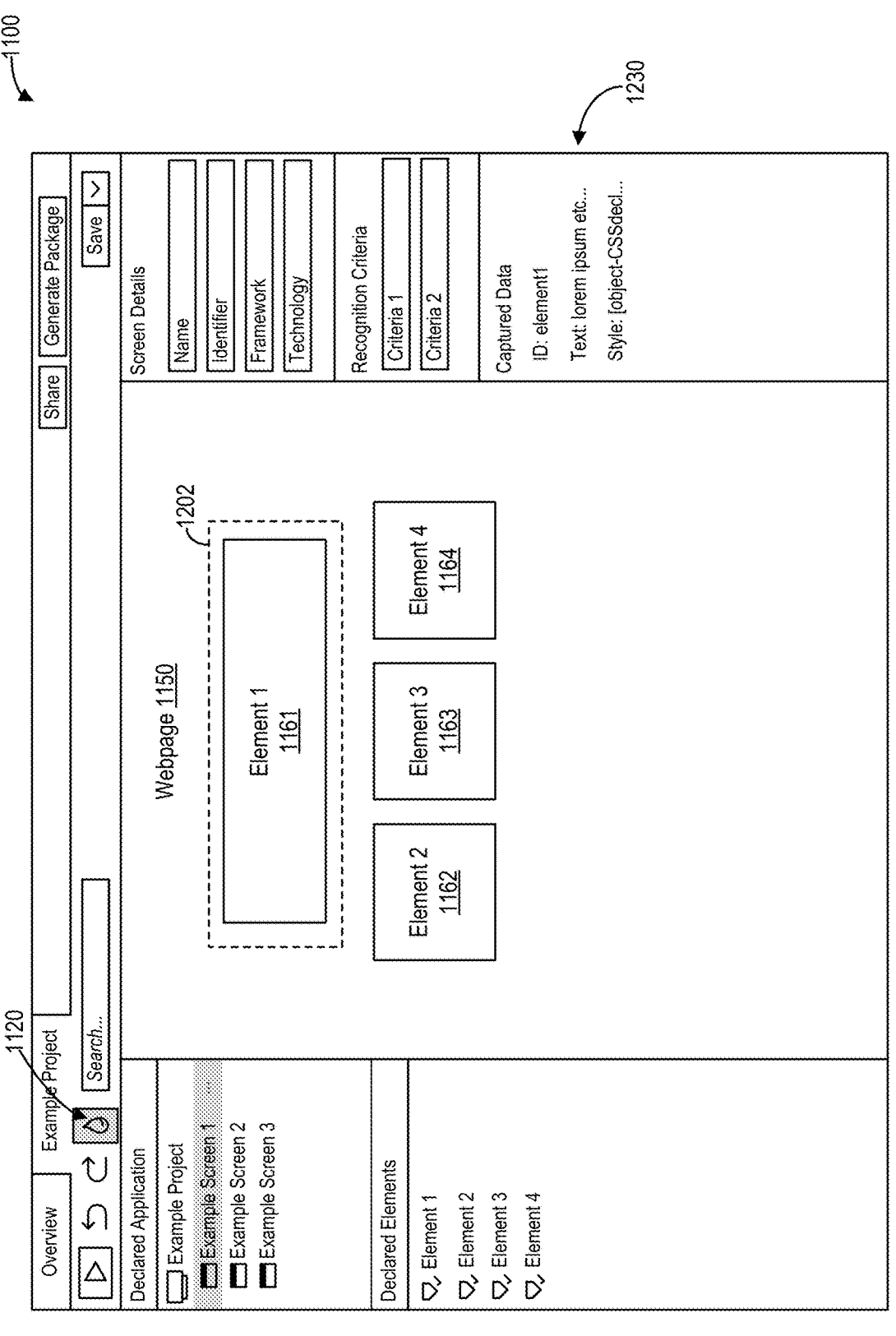
FIG. 12 is a view of a process editor user interface during obfuscation of graphical content, according to an embodiment.

The user interface 1100 includes a graphical data obfuscation tool 1120 that when selected allows the user to visually select which user interface elements 1160 in the webpage 1150 (i.e., the captured screen or artifact) to obfuscate. As depicted in FIG. 12, clicking on the graphical data obfuscation tool 1120 selects the tool 1120, which may be used by clicking and dragging the cursor selectively across the captured screen or webpage 1150 to define an area 1202 for obfuscation. As the first user interface element 1161 is within the area 1202, the first user interface element 1161 is selected for obfuscation. Thus, after releasing the cursor to thus define the area 1202, the first user interface element

Figure 13:
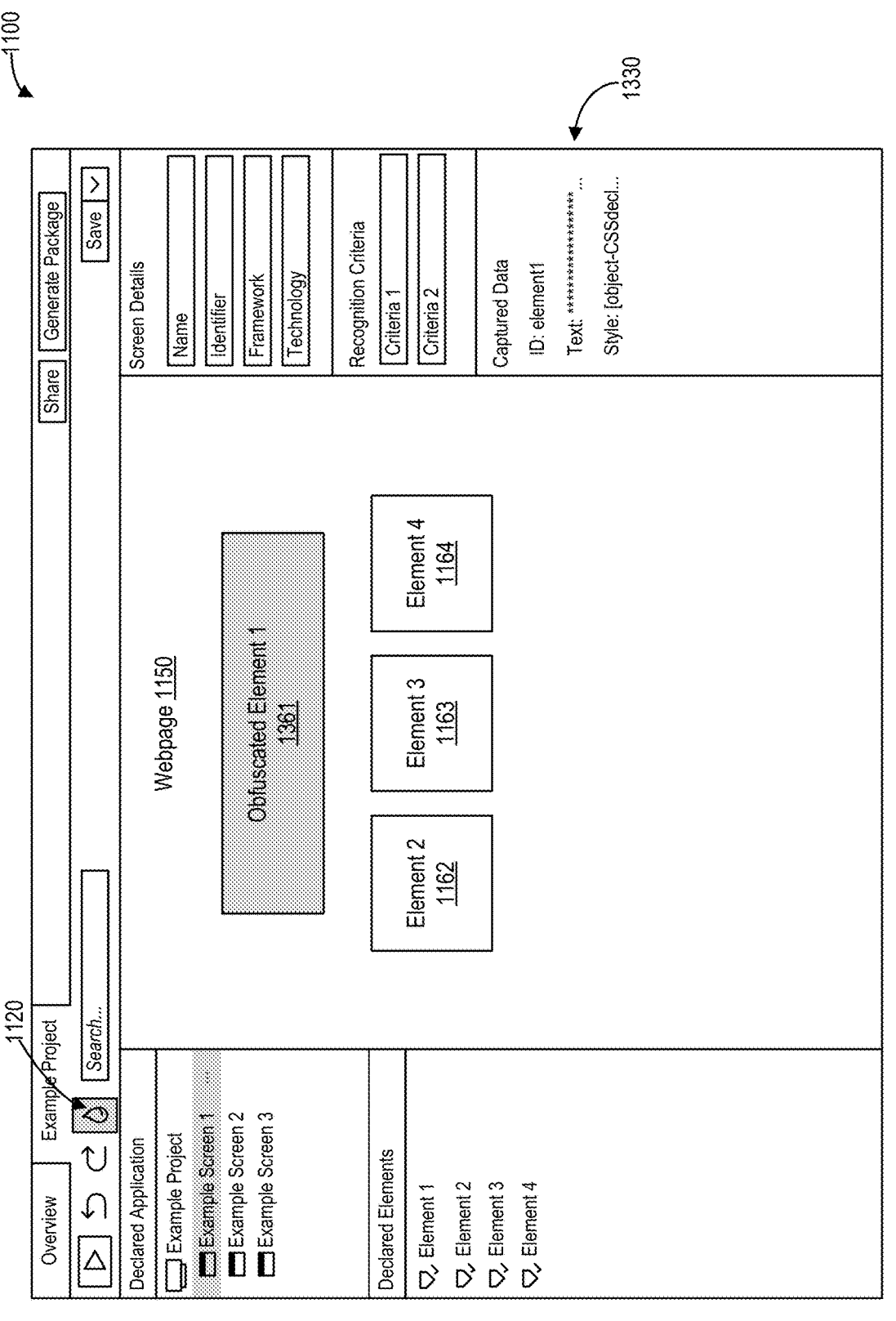
FIG. 13 is a view of a process editor user interface during obfuscation of graphical content, according to an embodiment.

1161 becomes obfuscated first user interface element (Obfuscated Element 1) 1361, as depicted in FIG. 13. The obfuscated user interface element 1361 may thus comprise a blurred representation of the first user interface element 1161, or may otherwise comprise a representation of the first user interface element 1161 transformed in such a way that the graphical data contained in the first user interface element 1161 cannot be extracted from the obfuscated user interface element 1361, though the structural properties of the obfuscated user interface element 1361 are otherwise the same as the first user interface element 1161. In this way, the automations designed using the captured screen corresponding to webpage 1150 may continue to function, despite the obfuscation of the user interface element 1161.

As depicted in FIG. 12, the captured data pane 1230 displays captured data for the first user interface element 1161, including text contained with the first user interface element 1161. As such text may contain sensitive data, the system may tokenize or otherwise anonymize the text contained in the first user interface element 1161 when obfuscating the first user interface element 1161. For example, the captured data pane 1330 depicts the text of the obfuscated user interface element 1361 as anonymized in comparison to the captured data pane 1230 for the first user interface element 1161.

Additionally or alternatively to the graphical data obfuscation tool 1120 which allows robotic process automation designers to quickly select one or more user interface elements for obfuscation, users may click on a target user interface element listed in the declared elements pane 1112 to obfuscate the target user interface element. For example, clicking on the listing 1412 of the second user interface element 1162 in the declared elements pane 1112 may open a menu 1420 containing one or more actions to perform on the declared element 1412, including a "Blur" or obfuscate action 1422. Selecting the obfuscate action 1422 in the menu 1420 for the user interface element 1412 in the declared elements pane 1112 causes the system to obfuscate the corresponding user interface element (i.e., the second user interface element 1162), such that the second user interface element 1162 becomes obfuscated second user interface element 1462 as depicted.

Thus, the user interface 1100 provides multiple approaches to obfuscating graphical content in a robotic process automation project.

Example 8—Additional Processes for Robotic Data Obfuscation

FIG. 15 is a high-level flow chart illustrating an example method 1500 for dynamic data masking for graphical and textual content in robotic process automation. The method 1500 can be carried out using the systems and components of FIGS. 1-3 and with the methods, processes, and user interfaces illustrated in FIGS. 4-14, though it should be appreciated that the method 1500 may be implemented with other systems and components without departing from the scope of the present disclosure. Method 1500 may be implemented using the computing environment 100 of FIG. 1 and/or the architecture 200 of FIG. 2, as an illustrative example.

Method 1500 begins at 1505. At 1505, method 1500 loads, from a first storage location, a robotic process automation project comprising captured data into a first application, wherein the captured data comprises data describing user interactions with a graphical user interface of a second application. At 1510, method 1500 identifies content in the captured data to be obfuscated to provide identified content. At 1515, method 1500 obfuscates content in the captured data to provide obfuscated content, the obfuscated content comprising at least a portion of the identified content. At 1520, method 1500 updates the robotic process automation project to replace at least the portion of the identified content with the obfuscated content to provide an updated robotic process automation project. At 1525, method 1500 stores, at a second storage location, the updated robotic process automation project, wherein the second storage location comprises the first storage location or a storage location other than the first storage location. Method 1500 then returns.

Example 9—Example Advantages

A number of advantages can be achieved via the technology described herein. For example, the robotic process automation system disclosed herein can automatically obfuscate sensitive data as a project is updated. The system can reliably and efficiently find user interface elements containing sensitive data, and dynamically mask such user interface elements to blur the elements. Further, the robotic process automation system described herein can offer increased efficiency and speed to robotic process automation designers who would like to share their projects with others without compromising sensitive data contained within a project. Further still, the approaches to robotic data obfuscation provided herein allow rapid and selective masking of graphical and textual content without interfering with the capturing process or the underlying automation process for robotic process automation. The technology described herein allows the use of existing data for testing and sharing, rather than creating new data, thereby saving time and computing resources. The technology described herein further allows for more realistic development, testing, and illustrative educational tools by using actual data compared with artificial data that might not accurately reflect data to be provided or used during deployment of an RPA bot.

Thus, the described technologies can be useful to allow a robotic process automation system to automatically and dynamically obfuscate data in projects and artifacts, even throughout updates and changes to the projects and artifacts, without comprising the quality of robotic process automation design.

Example 10—Computing Environments

Figure 16:
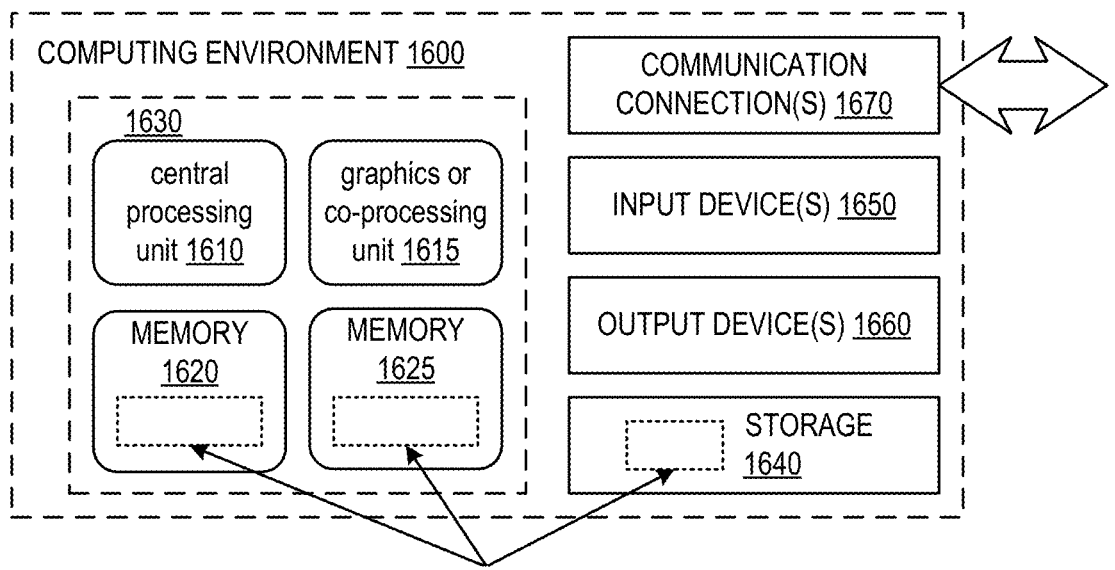
FIG. 16 is a block diagram of an example computing system in which described embodiments can be implemented.

FIG. 16 depicts an example of a suitable computing system 1600 in which the described innovations can be implemented. The computing system 1600 is not intended to suggest any limitation as to scope of use or functionality of the present disclosure, as the innovations can be implemented in diverse computing systems.

With reference to FIG. 16, the computing system 1600 includes one or more processing units 1610, 1615 and memory 1620, 1625. In FIG. 16, this basic configuration 1630 is included within a dashed line. The processing units 1610, 1615 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 16 shows a central processing unit 1610 as well as a graphics processing unit or co-processing unit 1615. The tangible memory 1620, 1625 can be volatile memory (e.g., registers, cache, RAM), non-volatile memory (e.g., ROM, EEPROM, flash memory, etc.), or some combination of the two, accessible by the processing unit(s) 1610, 1615. The memory 1620, 1625 stores software 1680 implementing one or more innovations described herein, in the form of computer-executable instructions suitable for execution by the processing unit(s) 1610, 1615.

A computing system 1600 can have additional features. For example, the computing system 1600 includes storage 1640, one or more input devices 1650, one or more output devices 1660, and one or more communication connections 1670, including input devices, output devices, and communication connections for interacting with a user. An interconnection mechanism (not shown) such as a bus, controller, or network interconnects the components of the computing system 1600. Typically, operating system software (not shown) provides an operating environment for other software executing in the computing system 1600, and coordinates activities of the components of the computing system 1600.

The tangible storage 1640 can be removable or non-removable, and includes magnetic disks, magnetic tapes or cassettes, CD-ROMs, DVDs, or any other medium which can be used to store information in a non-transitory way and which can be accessed within the computing system 1600. The storage 1640 stores instructions for the software 1680 implementing one or more innovations described herein.

The input device(s) 1650 can be an input device such as a keyboard, mouse, pen, or trackball, a voice input device, a scanning device, touch device (e.g., touchpad, display, or the like) or another device that provides input to the computing system 1600. The output device(s) 1660 can be a display, printer, speaker, CD-writer, or another device that provides output from the computing system 1600.

The communication connection(s) 1670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 11—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 12—Cloud Computing Environments

Figure 17:
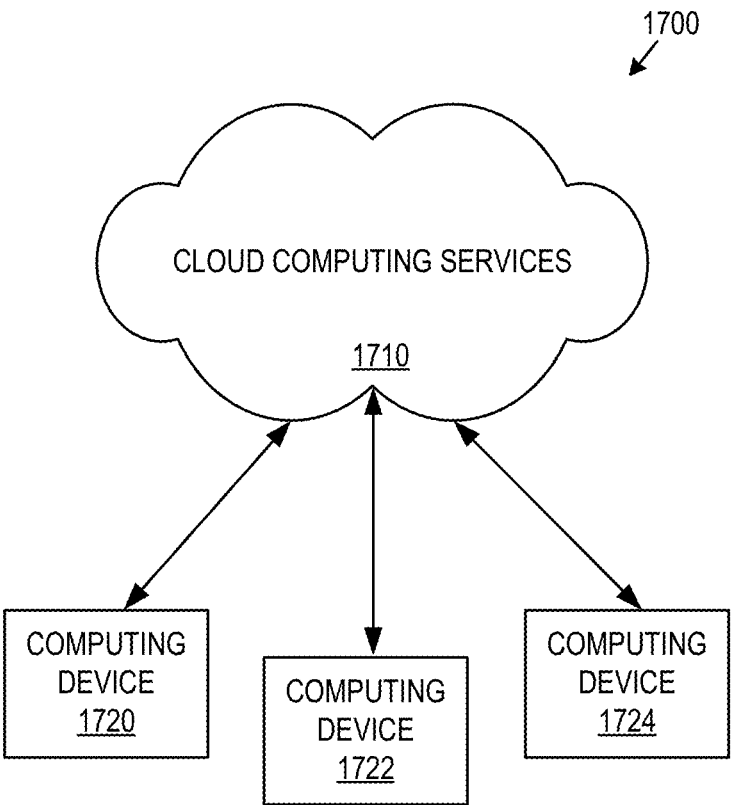
FIG. 17 is a block diagram of an example cloud computing environment that can be used in conjunction with the technologies described herein.

FIG. 17 depicts an example cloud computing environment 1700 in which the described technologies can be implemented, including, e.g., the system 100 of FIG. 1 and other systems herein. The cloud computing environment 1700 comprises cloud computing services 1710. The cloud computing services 1710 can comprise various types of cloud computing resources, such as computer servers, data storage repositories, networking resources, etc. The cloud computing services 1710 can be centrally located (e.g., provided by a data center of a business or organization) or distributed (e.g., provided by various computing resources located at different locations, such as different data centers and/or located in different cities or countries).

The cloud computing services 1710 are utilized by various types of computing devices (e.g., client computing devices), such as computing devices 1720, 1722, and 1724. For example, the computing devices (e.g., 1720, 1722, and 1724) can be computers (e.g., desktop or laptop computers), mobile devices (e.g., tablet computers or smart phones), or other types of computing devices. For example, the computing devices (e.g., 1720, 1722, and 1724) can utilize the cloud computing services 1710 to perform computing operations (e.g., data processing, data storage, and the like).

In practice, cloud-based, on-premises-based, or hybrid scenarios can be supported.

Example 13—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 14—Example Embodiments

Any of the following example embodiments can be implemented. In one example, a method, implemented in a computing system comprising at least one memory and at least one hardware processor coupled to the at least one memory, comprises: loading, from a first storage location, a robotic process automation project comprising captured data into a first application, wherein the captured data comprises data describing user interactions with a graphical user interface of a second application; identifying content in the captured data to be obfuscated to provide identified content; obfuscating content in the captured data to provide obfuscated content, the obfuscated content comprising at least a portion of the identified content; updating the robotic process automation project to replace at least the portion of the identified content with the obfuscated content to provide an updated robotic process automation project; and storing, at a second storage location, the updated robotic process automation project, wherein the second storage location comprises the first storage location or a storage location other than the first storage location.

In a first example of the method, the method further comprises receiving an obfuscation definition, wherein identifying the content in the captured data to be obfuscated to provide identified content comprises scanning the robotic process automation project based on the obfuscation definition to identify textual content in the captured data matching the obfuscation definition, wherein the obfuscation definition comprises one or more of at least one keyword and at least one keyword pattern. In a second example of the method optionally including the first example, the method further comprises displaying, via a user interface of the first application, the identified textual content, and receiving, from a user via the user interface of the first application, a selection of at least the portion of the identified textual content, wherein the obfuscating the content in the captured data comprises replacing the identified textual content in the selection with at least one substitute value. In a third example of the method optionally including one or more of the first and second examples, the method further comprises receiving, from the user via the user interface of the first application, input comprising the at least one substitute value. In a fourth example of the method optionally including one or more of the first through third examples, the method further comprises receiving the obfuscation definition from one or more of the user via the user interface of the first application and a storage device. In a fifth example of the method optionally including one or more of the first through fourth examples, the captured data comprises an image of a captured graphical user interface, and identifying the content in the captured data to be obfuscated comprises displaying, via a user interface of the application, the image of the captured graphical user interface, and receiving, from a user via the user interface, a selection of at least one user interface element in the image of the captured graphical user interface. In a sixth example of the method optionally including one or more of the first through fifth examples, obfuscating the content in the captured data comprises blurring at least a portion of the selection of the at least one user interface element in the image of the captured graphical user interface. In a seventh example of the method optionally including one or more of the first through sixth examples, the method further comprises applying optical character recognition to the image of the captured graphical user interface to obtain a text string from the at least one user interface element, wherein obfuscating the content in the captured data comprises replacing the text string in the selection of the at least one user interface element with a different text value. In an eighth example of the method optionally including one or more of the first through seventh examples, the different text value comprises at least one of a tokenization of the text string, a randomized text string, or a predefined substitute value. In a ninth example of the method optionally including one or more of the first through seventh examples, the receiving of the selection of the at least one user interface element in the image of the captured graphical user interface comprises receiving coordinates within the image of the captured graphical user interface defining an area in the image of the captured graphical user interface. In a tenth example of the method optionally including one or more of the first through ninth examples, the selection of the at least one user interface element comprises one or more of a user interface element entirely contained within the area and a subset of a user interface element contained within the area.

In another example, a computing system comprises at least one memory, one or more hardware processors coupled to the at least one memory, and one or more computer-readable storage media storing instructions that, when executed by the computing system, cause the computing system to: load, from a first storage location, one or more automation artifacts comprising captured data, wherein the captured data comprises data describing user interactions with at least one graphical user interface of at least one application; identify content in the captured data to be obfuscated to provide identified content; obfuscate content in the captured data to provide obfuscated content, the obfuscated content comprising at least a portion of the identified content; update the one or more automation artifacts to replace at least the portion of the identified content with the obfuscated content to provide one or more updated automation artifacts; and store, at the first storage location or a storage location other than the first storage location, the one or more updated automation artifacts.

In a first example of the computing system, the one or more computer-readable storage media further store instructions that, when executed, cause the one or more hardware processors to: receive an obfuscation definition; scan the automation artifact based on the obfuscation definition to identify textual content in the captured data matching the obfuscation definition, wherein the identified content comprises the identified textual content; display, via a display device communicatively coupled to the one or more hardware processors, the identified textual content; and receive, via a user input device communicatively coupled to the one or more hardware processors, a selection of at least the portion of the identified textual content, wherein obfuscating the content in the captured data comprises replacing the identified textual content in the selection with at least one substitute value. In a second example of the computing system optionally including the first example, the obfuscation definition comprises one or more keywords. In a third example of the computing system optionally including one or more of the first and second examples, the obfuscation definition comprises one or more predefined regular expressions. In a fourth example of the computing system optionally including one or more of the first through third examples, displaying the identified textual content comprises displaying a context of the identified textual content, the context comprising text adjacent to the identified textual content, an automation artifact of the plurality of automation artifacts containing the identified textual content, and an identification of a user interface element containing the identified textual content. In a fifth example of the computing system optionally including one or more of the first through fourth examples, the identified textual content comprises a plurality of text strings located in different user interface elements, and the at least the portion of the identified textual content comprises at least one text string of the plurality of text strings. In a sixth example of the computing system optionally including one or more of the first through fifth examples, the at least one substitute value comprises one or more of a tokenization of the identified textual content, a randomized text string, or a predefined substitute value. In a seventh example of the computing system optionally including one or more of the first through sixth examples, the captured data comprises a captured graphical user interface, and, to identify the content in the captured data to be obfuscated, the one or more computer-readable storage media further store instructions that, when executed, cause the one or more hardware processors to: display, via a display device communicatively coupled to at least one of the one or more hardware processors, the captured graphical user interface; and receive, from a user via a user input device communicatively coupled to the one or more hardware processors, a selection of at least one user interface element in the captured graphical user interface, and wherein, to obfuscate the content in the captured data, the one or more computer-readable storage media further store instructions that, when executed, cause the one or more hardware processors to: blur at least a portion of the selection of the at least one user interface element in the captured graphical user interface.

In yet another example, one or more computer-readable media comprise computer-executable instructions that, when executed by a computing system comprising at least one hardware processor and at least one memory coupled to the at least one hardware processor, cause the computing system to: load, from a first storage location, a robotic process automation project comprising captured data, wherein the captured data comprises data describing user interactions with a graphical user interface of an application; identify content in the captured data to be obfuscated to provide identified content; obfuscate content in the captured data to provide obfuscated content, the obfuscated content including at least a portion of the identified content; update the project to replace at least the portion of the identified content with the obfuscated content to provide an updated project; and store, at the first storage location or a storage location other than the first storage location, the updated project.

Example 15—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A method, implemented in a computing system comprising at least one memory and at least one hardware processor coupled to the at least one memory, the method comprising:

loading, from a first storage location, a process automation project comprising a plurality of stored project content artifacts, at least two stored project content artifacts of the plurality of stored project content artifacts comprising obfuscatable content, wherein the at least two stored project content artifacts comprise information processable to be rendered in a user interface;

accessing an obfuscation policy to be applied to the at least two project content artifacts;

receiving a modification to a stored project content artifact of the at least two stored project content artifacts to provide an updated stored project content artifact or receiving a modification to the obfuscation policy to provide an updated obfuscation policy; and (1) when the modification is to a stored project content artifact, on reload or refresh of the process automation project, applying the obfuscation policy to the updated stored project content artifact, wherein the applying results in a different obfuscation than for a previously applied obfuscation of the stored project content artifact prior to the modification; or (2) when the modification is to the obfuscation policy, on reload or refresh of the process automation project, applying the updated obfuscation policy to a stored project content artifact of the plurality of stored project content artifacts, wherein the applying results in a different obfuscation than for a previously applied obfuscation of the stored project content artifact prior to the modification.

2. The method of claim 1, wherein the obfuscation policy comprises one or more of at least one keyword and at least one keyword pattern.

3. The method of claim 2, further comprising:

displaying, via a user interface, textual content of a stored project content artifact of the at least two stored project content artifacts; and receiving, from a user via the user interface, a selection of at least a portion of the textual content and replacing the at least the portion of the textual content in the selection with at least one substitute value.

4. The method of claim 3, further comprising:

receiving, from the user via the user interface, input comprising the at least one substitute value.

5. The method of claim 3, further comprising receiving the obfuscation policy from one or more of the user via the user interface and a storage device.

6. The method of claim 1, wherein a least one of the at least two stored project content artifacts comprises an image of a captured graphical user interface, and the method further comprises:

displaying, via a user interface of an application, the image of the captured graphical user interface; and receiving, from a user via the user interface, a selection of at least one user interface element in the image of the captured graphical user interface.

7. The method of claim 6, further comprising:

blurring at least a portion of the selection of the at least one user interface element in the image of the captured graphical user interface.

8. The method of claim 6, further comprising applying optical character recognition to the image of the captured graphical user interface to obtain a text string from the at least one user interface element; and replacing the text string in the selection of the at least one user interface element with a different text value.

9. The method of claim 8, wherein the different text value comprises at least one of a tokenization of the text string, a randomized text string, or a predefined substitute value.

10. The method of claim 6, wherein the receiving of the selection of the at least one user interface element in the image of the captured graphical user interface comprises receiving coordinates within the image of the captured graphical user interface defining an area in the image of the captured graphical user interface.

11. The method of claim 10, wherein the selection of the at least one user interface element comprises one or more of a user interface element entirely contained within the area and a subset of a user interface element contained within the area.

12. A computing system, comprising:

at least one memory;

one or more hardware processors coupled to the at least one memory; and one or more computer-readable storage media storing instructions that, when executed by the computing system, cause the computing system to:

load, from a first storage location, one or more stored project content artifacts, at least one stored project content artifacts of the plurality comprising obfuscatable content accessing an obfuscation policy to be applied to the stored project content artifact;

receiving a modification to the stored project content artifact to provide an updated stored project content artifact or receiving a modification to the obfuscation policy to provide an updated obfuscation policy; and (1) when the modification is to the stored project content artifact, on reload or refresh of the process automation project, applying the obfuscation policy to the updated stored project content artifact, wherein the applying results in a different obfuscation than for a previously applied obfuscation of the stored project content artifact prior to the modification; or (2) when the modification is to the obfuscation policy, on reload or refresh of the process automation project, applying the updated obfuscation policy to the stored project content artifact, wherein the applying results in a different obfuscation than for a previously applied obfuscation of the stored project content artifact prior to the modification.

13. The computing system of claim 12, wherein the one or more computer-readable storage media further store instructions that, when executed, cause the one or more hardware processors to:

receive the obfuscation policy;

scan the stored project content artifact based on the obfuscation policy to identify textual content satisfying the obfuscation policy to provide identified textual content;

display, via a display device communicatively coupled to the one or more hardware processors, the identified textual content; and receive, via a user input device communicatively coupled to the one or more hardware processors, a selection of at least the portion of the identified textual content; and replacing the identified textual content in the selection with at least one substitute value.

14. The computing system of claim 13, wherein the obfuscation policy comprises one or more keywords.

15. The computing system of claim 13, wherein the obfuscation policy comprises one or more predefined regular expressions.

16. The computing system of claim 13, wherein displaying the identified textual content comprises displaying a context of the identified textual content, the context comprising text adjacent to the identified textual content, an automation artifact of the plurality of automation artifacts containing the identified textual content, and an identification of a user interface element containing the identified textual content.

17. The computing system of claim 16, wherein the identified textual content comprises a plurality of text strings located in different user interface elements, and wherein the at least the portion of the identified textual content comprises at least one text string of the plurality of text strings.

18. The computing system of claim 13, wherein the at least one substitute value comprises one or more of a tokenization of the identified textual content, a randomized text string, or a predefined substitute value.

19. The computing system of claim 12, wherein the stored project content artifact comprises a captured graphical user interface, and wherein, to identify content in the stored project content artifact to be obfuscated, the one or more computer-readable storage media further store instructions that, when executed, cause the one or more hardware processors to:

display, via a display device communicatively coupled to at least one of the one or more hardware processors, the captured graphical user interface;

receive, from a user via a user input device communicatively coupled to the one or more hardware processors, a selection of at least one user interface element in the captured graphical user interface, and blur at least a portion of the selection of the at least one user interface element in the captured graphical user interface.

20. One or more non-transitory computer-readable media comprising computer-executable instructions that, when executed by a computing system comprising at least one hardware processor and at least one memory coupled to the at least one hardware processor, cause the computing system to:

load, from a first storage location, a process automation project comprising a plurality of stored project content artifacts, at least two stored project content artifacts of the plurality of stored project content artifacts comprising obfuscatable content, wherein the at least two stored project content artifacts comprise information processable to be rendered in a user interface;

accessing an obfuscation policy to be applied to the at least two project content artifacts;

receiving a modification to a stored project content artifact of the at least two stored project content artifacts to provide an updated stored project content artifact or receiving a modification to the obfuscation policy to provide an updated obfuscation policy; and (1) when the modification is to a stored project content artifact, on reload or refresh of the process automation project, applying the obfuscation policy to the updated stored project content artifact, wherein the applying results in a different obfuscation than for a previously applied obfuscation of the stored project content artifact prior to the modification; or (2) when the modification is to the obfuscation policy, on reload or refresh of the process automation project, applying the updated obfuscation policy to a stored project content artifact of the plurality of stored project content artifacts, wherein the applying results in a different obfuscation than for a previously applied obfuscation of the stored project content artifact prior to the modification.

* * * * *